United States Patent
Armandpour et al.

(10) Patent No.: US 8,069,407 B1
(45) Date of Patent: Nov. 29, 2011

(54) METHOD AND APPARATUS FOR DETECTING CHANGES IN WEBSITES AND REPORTING RESULTS TO WEB DEVELOPERS FOR NAVIGATION TEMPLATE REPAIR PURPOSES

(75) Inventors: Tim Armandpour, Redwood City, CA (US); Masroor Malik, Union City, CA (US)

(73) Assignee: Yodlee.com, Inc., Redwood City, CA (US)

( * ) Notice: Subject to any disclaimer, the term of this patent is extended or adjusted under 35 U.S.C. 154(b) by 1205 days.

(21) Appl. No.: 09/656,531

(22) Filed: Sep. 7, 2000

Related U.S. Application Data

(63) Continuation-in-part of application No. 09/639,346, filed on Aug. 15, 2000, which is a continuation-in-part of application No. 09/573,699, filed on May 19, 2000, which is a continuation-in-part of application No. 09/208,740, filed on Dec. 8, 1998.

(51) Int. Cl.
*G06F 17/30* (2006.01)
*G06F 11/00* (2006.01)
*G06F 9/44* (2006.01)

(52) U.S. Cl. ........ 715/234; 715/255; 717/116; 717/172; 707/705; 707/758; 714/38.1; 714/39

(58) Field of Classification Search .................. 715/517, 715/513, 511, 209, 210, 234, 255, 229; 709/224, 709/203, 223; 714/4, 1, 38.1, 39; 707/1, 707/3, 6, 705, 758; 717/110, 168, 172, 170, 717/115, 116, 120
See application file for complete search history.

(56) References Cited

U.S. PATENT DOCUMENTS
4,727,243 A 2/1988 Savar
(Continued)

FOREIGN PATENT DOCUMENTS
EP 0747843 12/1996
(Continued)

OTHER PUBLICATIONS
W3C's, "HTML 4.0 Specification," Apr. 24, 1998, http://www.w3.org/TR/1998/REC-html40-19980424/, pp. 1-27.*

(Continued)

*Primary Examiner* — Adam Basehoar
(74) *Attorney, Agent, or Firm* — Donald R. Boys; Central Coast Patent Agency, Inc.

(57) ABSTRACT

A software application for enabling automated notification of applied structural changes to electronic information pages hosted on a data packet network is provided. The software application comprises, a developer-interface module for enabling developers to build and modify navigation templates using functional logic blocks, a navigation system-interface module for integrating the software application to a proxy-navigation system for periodic execution of the templates, a change-notification module for indicating a point in process where a navigation routine has failed and for creating a data file containing parameters associated with the failed navigation routine and a database interface module for interfacing the software application to a data repository for storing the data file. The software application periodically submits test navigation and interaction routines to the navigation system for execution by virtue of the interface with the navigation system. Upon failure of a test routine, the software application creates the data file. The data file, comprises a point-of-failure indication within the failed navigation routine, an identifier of the associated electronic information page subjected to the navigation routine, and a brief description of the cause of failure. The software application stores the data file in the data repository sending notification of the action to the developer.

10 Claims, 13 Drawing Sheets

U.S. PATENT DOCUMENTS

| | | | |
|---|---|---|---|
| 4,987,538 A | 1/1991 | Johnson et al. | |
| 5,220,501 A | 6/1993 | Lawlor et al. | |
| 5,237,499 A | 8/1993 | Garback | |
| 5,318,007 A | 6/1994 | Afshar | |
| 5,340,537 A | 8/1994 | Barrett | |
| 5,347,632 A | 9/1994 | Filepp et al. | |
| 5,423,033 A | 6/1995 | Yuen | |
| 5,446,891 A | 8/1995 | Kaplan et al. | |
| 5,459,306 A | 10/1995 | Stein et al. | |
| 5,481,672 A | 1/1996 | Okuno et al. | |
| 5,483,445 A | 1/1996 | Pickering | |
| 5,537,314 A | 7/1996 | Kanter | |
| 5,590,196 A | 12/1996 | Moreau | |
| 5,611,048 A | 3/1997 | Jacobs et al. | |
| 5,613,012 A | 3/1997 | Hoffman et al. | |
| 5,619,648 A | 4/1997 | Canale et al. | |
| 5,619,716 A | 4/1997 | Nonaka et al. | |
| 5,634,127 A | 5/1997 | Cloud et al. | |
| 5,640,577 A | 6/1997 | Scharmer | |
| 5,644,576 A | 7/1997 | Bauchot et al. | |
| 5,649,118 A | 7/1997 | Carlisle et al. | |
| 5,649,186 A | 7/1997 | Ferguson | |
| 5,655,089 A | 8/1997 | Bucci | |
| 5,696,965 A | 12/1997 | Dedrick | |
| 5,699,528 A | 12/1997 | Hogan | |
| 5,701,451 A | 12/1997 | Rogers et al. | |
| 5,706,442 A | 1/1998 | Anderson et al. | |
| 5,708,825 A | 1/1998 | Sotomayor | |
| 5,710,887 A | 1/1998 | Chellish et al. | |
| 5,710,918 A | 1/1998 | Lagarde et al. | |
| 5,712,979 A | 1/1998 | Graber et al. | |
| 5,717,923 A | 2/1998 | Dedrick | |
| 5,721,908 A | 2/1998 | Lagarde et al. | |
| 5,724,567 A | 3/1998 | Rose et al. | |
| 5,724,595 A | 3/1998 | Gentner | |
| 5,727,156 A | 3/1998 | Herr-Hoyman et al. | |
| 5,732,074 A | 3/1998 | Spaur et al. | |
| 5,740,365 A | 4/1998 | Pfeiffer et al. | |
| 5,740,549 A | 4/1998 | Reilly et al. | |
| 5,745,754 A | 4/1998 | Lagarde et al. | |
| 5,745,884 A | 4/1998 | Carnegie et al. | |
| 5,752,246 A | 5/1998 | Rogers et al. | |
| 5,758,577 A | 6/1998 | Kleewin et al. | |
| 5,768,521 A | 6/1998 | Dedrick | |
| 5,774,123 A * | 6/1998 | Matson | 715/854 |
| 5,778,367 A | 7/1998 | Wesinger, Jr. et al. | |
| 5,778,368 A | 7/1998 | Hogan et al. | |
| 5,787,425 A | 7/1998 | Bigus | |
| 5,790,789 A | 8/1998 | Suarez | |
| 5,790,793 A | 8/1998 | Higley | |
| 5,793,964 A | 8/1998 | Rogers et al. | |
| 5,793,966 A | 8/1998 | Amstein et al. | |
| 5,794,233 A | 8/1998 | Rubinstein | |
| 5,796,945 A | 8/1998 | Tarabella | |
| 5,799,151 A | 8/1998 | Hoffer | |
| 5,805,719 A | 9/1998 | Pare, Jr. et al. | |
| 5,812,769 A | 9/1998 | Graber et al. | |
| 5,813,007 A | 9/1998 | Nielsen | |
| 5,815,665 A | 9/1998 | Teper et al. | |
| 5,818,935 A | 10/1998 | Maa | |
| 5,819,284 A | 10/1998 | Farber et al. | |
| 5,825,884 A | 10/1998 | Zdepski et al. | |
| 5,828,839 A | 10/1998 | Moncreiff | |
| 5,832,474 A | 11/1998 | Lopresti et al. | |
| 5,832,494 A | 11/1998 | Egger et al. | |
| 5,835,724 A | 11/1998 | Smith et al. | |
| 5,838,910 A | 11/1998 | Domenikos et al. | |
| 5,838,916 A | 11/1998 | Domenikos et al. | |
| 5,838,918 A | 11/1998 | Prager et al. | |
| 5,842,185 A | 11/1998 | Chancey et al. | |
| 5,845,073 A | 12/1998 | Carlin et al. | |
| 5,848,396 A | 12/1998 | Gerace | |
| 5,854,897 A | 12/1998 | Radziewicz et al. | |
| 5,855,015 A | 12/1998 | Shoham | |
| 5,855,020 A | 12/1998 | Kirsch | |
| 5,860,068 A | 1/1999 | Cook | |
| 5,860,073 A | 1/1999 | Ferrel et al. | |
| 5,862,325 A | 1/1999 | Reed et al. | |
| 5,870,546 A | 2/1999 | Kirsch | |
| 5,870,552 A | 2/1999 | Dozier et al. | |
| 5,875,296 A | 2/1999 | Shi et al. | |
| 5,875,437 A | 2/1999 | Atkins | |
| 5,878,215 A | 3/1999 | Kling et al. | |
| 5,878,219 A | 3/1999 | Vance, Jr. et al. | |
| 5,878,408 A | 3/1999 | Van Huben et al. | |
| 5,884,033 A | 3/1999 | Duvall et al. | |
| 5,884,035 A | 3/1999 | Butman et al. | |
| 5,884,045 A | 3/1999 | Kurihara | |
| 5,887,133 A | 3/1999 | Brown et al. | |
| 5,890,140 A | 3/1999 | Clark et al. | |
| 5,890,152 A | 3/1999 | Rapaport et al. | |
| 5,892,900 A | 4/1999 | Ginter et al. | |
| 5,892,909 A | 4/1999 | Grasso et al. | |
| 5,893,075 A | 4/1999 | Plainfield et al. | |
| 5,893,091 A | 4/1999 | Hunt et al. | |
| 5,893,128 A | 4/1999 | Nauckhoff | |
| 5,894,554 A | 4/1999 | Lowery et al. | |
| 5,895,468 A | 4/1999 | Whitmyer, Jr. | |
| 5,895,838 A | 4/1999 | Harjunmaa et al. | |
| 5,897,620 A | 4/1999 | Walker et al. | |
| 5,897,622 A | 4/1999 | Blinn et al. | |
| 5,898,836 A * | 4/1999 | Freivald et al. | 709/218 |
| 5,901,287 A | 5/1999 | Bull et al. | |
| 5,903,881 A | 5/1999 | Schrader et al. | |
| 5,905,736 A | 5/1999 | Ronen et al. | |
| 5,905,865 A | 5/1999 | Palmer et al. | |
| 5,907,837 A | 5/1999 | Ferrel et al. | |
| 5,907,838 A | 5/1999 | Miyasaka et al. | |
| 5,908,469 A | 6/1999 | Botz et al. | |
| 5,913,202 A | 6/1999 | Motoyama | |
| 5,913,214 A * | 6/1999 | Madnick et al. | 707/10 |
| 5,918,019 A | 6/1999 | Valencia | |
| 5,918,214 A | 6/1999 | Perkowski | |
| 5,920,848 A | 7/1999 | Schutzer et al. | |
| 5,923,736 A | 7/1999 | Shachar | |
| 5,924,090 A | 7/1999 | Krellenstein | |
| 5,926,798 A | 7/1999 | Carter | |
| 5,930,777 A | 7/1999 | Barber | |
| 5,931,907 A | 8/1999 | Davies et al. | |
| 5,931,947 A | 8/1999 | Burns et al. | |
| 5,933,604 A | 8/1999 | Inakoshi | |
| 5,933,811 A | 8/1999 | Angles et al. | |
| 5,933,816 A | 8/1999 | Zeanah et al. | |
| 5,937,168 A | 8/1999 | Anderson et al. | |
| 5,937,392 A | 8/1999 | Alberts | |
| 5,943,424 A | 8/1999 | Berger et al. | |
| 5,948,040 A | 9/1999 | DeLorme et al. | |
| 5,949,326 A | 9/1999 | Wicks et al. | |
| 5,951,637 A | 9/1999 | Kuzma | |
| 5,951,642 A | 9/1999 | Onoe et al. | |
| 5,953,949 A | 9/1999 | Behr et al. | |
| 5,956,709 A | 9/1999 | Xue | |
| 5,958,008 A * | 9/1999 | Pogrebisky et al. | 709/223 |
| 5,961,593 A | 10/1999 | Gabber et al. | |
| 5,961,601 A | 10/1999 | Iyengar | |
| 5,963,915 A | 10/1999 | Kirsch | |
| 5,963,924 A | 10/1999 | Williams et al. | |
| 5,963,925 A | 10/1999 | Kolling et al. | |
| 5,963,952 A | 10/1999 | Smith | |
| 5,963,964 A | 10/1999 | Nielsen | |
| 5,963,967 A | 10/1999 | Umen et al. | |
| 5,966,441 A | 10/1999 | Calamera | |
| 5,966,697 A | 10/1999 | Fergerson et al. | |
| 5,974,406 A | 10/1999 | Bisdikian et al. | |
| 5,974,430 A | 10/1999 | Mutschler et al. | |
| 5,978,766 A | 11/1999 | Luciw | |
| 5,978,779 A | 11/1999 | Stein et al. | |
| 5,978,780 A | 11/1999 | Watson | |
| 5,978,828 A | 11/1999 | Greer et al. | |
| 5,978,842 A | 11/1999 | Noble | |
| 5,982,891 A | 11/1999 | Ginter et al. | |
| 5,983,170 A | 11/1999 | Goodman | |
| 5,983,200 A | 11/1999 | Slotznick | |
| 5,983,214 A | 11/1999 | Lang et al. | |
| 5,983,227 A | 11/1999 | Nazem et al. | |
| 5,983,268 A | 11/1999 | Freivald | |
| 5,987,440 A | 11/1999 | O'Neil et al. | |

| Patent | Date | Name |
|---|---|---|
| 5,987,454 A | 11/1999 | Hobbs |
| 5,987,466 A | 11/1999 | Greer et al. |
| 5,987,498 A | 11/1999 | Athing et al. |
| 5,987,611 A | 11/1999 | Freund |
| 5,990,887 A | 11/1999 | Redpath et al. |
| 5,991,735 A | 11/1999 | Gerace |
| 5,991,756 A | 11/1999 | Wu |
| 5,995,756 A | 11/1999 | Herrmann |
| 5,995,943 A | 11/1999 | Bull et al. |
| 5,995,965 A | 11/1999 | Experton |
| 5,996,010 A | 11/1999 | Leong et al. |
| 5,999,179 A | 12/1999 | Kekic et al. |
| 5,999,940 A | 12/1999 | Ranger |
| 5,999,975 A | 12/1999 | Kittaka et al. |
| 6,000,033 A | 12/1999 | Kelly et al. |
| 6,000,832 A | 12/1999 | Franklin et al. |
| 6,003,077 A | 12/1999 | Bawden et al. |
| 6,006,227 A | 12/1999 | Freeman et al. |
| 6,006,333 A | 12/1999 | Nielsen |
| 6,009,408 A | 12/1999 | Buchanan |
| 6,009,429 A | 12/1999 | Greer et al. |
| 6,012,087 A * | 1/2000 | Freivald et al. ............... 709/218 |
| 6,014,429 A | 1/2000 | LaPorta et al. |
| 6,014,502 A | 1/2000 | Moraes |
| 6,018,724 A | 1/2000 | Arent |
| 6,023,684 A | 2/2000 | Pearson |
| 6,023,698 A | 2/2000 | Lavey |
| 6,029,175 A | 2/2000 | Chow et al. |
| 6,029,180 A | 2/2000 | Murata et al. |
| 6,029,182 A | 2/2000 | Nehab et al. |
| 6,029,195 A | 2/2000 | Herz |
| 6,029,207 A * | 2/2000 | Heninger ..................... 719/331 |
| 6,031,354 A | 2/2000 | Wiley et al. |
| 6,032,162 A | 2/2000 | Burke |
| 6,038,601 A | 3/2000 | Lambert et al. |
| 6,038,603 A | 3/2000 | Joseph |
| 6,038,668 A | 3/2000 | Chipman et al. |
| 6,041,307 A | 3/2000 | Ahuja et al. |
| 6,041,326 A | 3/2000 | Amro et al. |
| 6,044,372 A | 3/2000 | Rothfus et al. |
| 6,044,465 A | 3/2000 | Dutcher et al. |
| 6,055,236 A | 4/2000 | Nessett et al. |
| 6,055,570 A | 4/2000 | Nielsen |
| 6,058,250 A | 5/2000 | Harwood et al. |
| 6,058,417 A | 5/2000 | Hess et al. |
| 6,061,700 A | 5/2000 | Brobst et al. |
| 6,061,716 A | 5/2000 | Moncreiff |
| 6,064,985 A | 5/2000 | Anderson |
| 6,065,120 A | 5/2000 | Laursen et al. |
| 6,070,150 A | 5/2000 | Remington et al. |
| 6,073,173 A | 6/2000 | Bittinger et al. |
| 6,078,907 A | 6/2000 | Lamm |
| 6,078,924 A | 6/2000 | Ainsbury et al. |
| 6,078,929 A | 6/2000 | Rao |
| 6,081,830 A | 6/2000 | Schindler |
| 6,084,585 A | 7/2000 | Kraft et al. |
| 6,085,186 A | 7/2000 | Christianson et al. |
| 6,085,188 A | 7/2000 | Bachmann et al. |
| 6,085,229 A | 7/2000 | Newman et al. |
| 6,085,238 A | 7/2000 | Yuasa et al. |
| 6,088,700 A | 7/2000 | Larsen et al. |
| 6,088,711 A | 7/2000 | Fein et al. |
| 6,088,722 A | 7/2000 | Herz et al. |
| 6,101,500 A | 8/2000 | Lau |
| 6,108,686 A | 8/2000 | Williams, Jr. |
| 6,108,691 A | 8/2000 | Lee et al. |
| 6,112,212 A | 8/2000 | Heitler |
| 6,119,079 A | 9/2000 | Wang et al. |
| 6,119,098 A | 9/2000 | Guyot et al. |
| 6,119,101 A | 9/2000 | Peckover |
| 6,119,229 A | 9/2000 | Martinez et al. |
| 6,122,673 A | 9/2000 | Basak et al. |
| 6,125,186 A | 9/2000 | Saito et al. |
| 6,125,352 A | 9/2000 | Franklin et al. |
| 6,128,602 A | 10/2000 | Northington et al. |
| 6,128,603 A | 10/2000 | Dent et al. |
| 6,128,624 A | 10/2000 | Papierniak et al. |
| 6,128,655 A | 10/2000 | Fields et al. |
| 6,131,115 A | 10/2000 | Anderson et al. |
| 6,134,532 A | 10/2000 | Lazarus et al. |
| 6,134,534 A | 10/2000 | Walker et al. |
| 6,134,548 A | 10/2000 | Gottsman et al. |
| 6,134,658 A | 10/2000 | Multerer et al. |
| 6,138,155 A | 10/2000 | Davis et al. |
| 6,138,158 A | 10/2000 | Boyle |
| 6,141,333 A | 10/2000 | Chavez, Jr. |
| 6,141,651 A | 10/2000 | Riley et al. |
| 6,147,975 A | 11/2000 | Bowman-Amuah |
| 6,148,402 A | 11/2000 | Campbell |
| 6,157,924 A | 12/2000 | Austin |
| 6,167,448 A | 12/2000 | Hemphill et al. |
| 6,169,992 B1 | 1/2001 | Beall et al. |
| 6,172,677 B1 | 1/2001 | Stautner et al. |
| 6,175,864 B1 | 1/2001 | Addison et al. |
| 6,181,786 B1 | 1/2001 | Detampel et al. |
| 6,182,085 B1 | 1/2001 | Eichstaedt |
| 6,182,142 B1 | 1/2001 | Win |
| 6,182,229 B1 | 1/2001 | Nielsen |
| 6,185,601 B1 | 2/2001 | Wolff |
| 6,192,380 B1 | 2/2001 | Light et al. |
| 6,192,407 B1 | 2/2001 | Smith et al. |
| 6,195,651 B1 | 2/2001 | Handel et al. |
| 6,199,077 B1 | 3/2001 | Inala et al. |
| 6,199,079 B1 | 3/2001 | Gupta et al. |
| 6,199,082 B1 | 3/2001 | Ferrel et al. |
| 6,199,099 B1 | 3/2001 | Gershman et al. |
| 6,199,113 B1 | 3/2001 | Alegre et al. |
| 6,202,062 B1 | 3/2001 | Cameron et al. |
| 6,202,207 B1 * | 3/2001 | Donohue ....................... 717/173 |
| 6,202,210 B1 | 3/2001 | Ludtke |
| 6,205,433 B1 | 3/2001 | Boesch |
| 6,205,456 B1 | 3/2001 | Nakao |
| 6,205,473 B1 | 3/2001 | Thomasson et al. |
| 6,208,336 B1 * | 3/2001 | Carter ........................... 715/866 |
| 6,208,975 B1 | 3/2001 | Bull |
| 6,212,548 B1 | 4/2001 | DeSimone et al. |
| 6,219,705 B1 | 4/2001 | Steinberger et al. |
| 6,223,292 B1 | 4/2001 | Dean et al. |
| 6,226,648 B1 | 5/2001 | Appleman et al. |
| 6,226,750 B1 | 5/2001 | Trieger |
| 6,233,592 B1 | 5/2001 | Schnelle et al. |
| 6,233,608 B1 | 5/2001 | Laursen et al. |
| 6,236,991 B1 | 5/2001 | Frauenhofer et al. |
| 6,236,994 B1 | 5/2001 | Swartz et al. |
| 6,237,096 B1 | 5/2001 | Bisbee et al. |
| 6,240,443 B1 | 5/2001 | Suzuki et al. |
| 6,243,755 B1 | 6/2001 | Takagi et al. |
| 6,252,544 B1 | 6/2001 | Hoffberg |
| 6,253,188 B1 | 6/2001 | Witek et al. |
| 6,253,208 B1 | 6/2001 | Wittgreffe et al. |
| 6,253,326 B1 | 6/2001 | Lincke et al. |
| 6,260,039 B1 | 7/2001 | Schneck et al. |
| 6,263,501 B1 | 7/2001 | Schein et al. |
| 6,266,615 B1 | 7/2001 | Jin |
| 6,266,774 B1 | 7/2001 | Sampath et al. |
| 6,271,840 B1 | 8/2001 | Finseth et al. |
| 6,278,993 B1 | 8/2001 | Kumar et al. |
| 6,279,037 B1 | 8/2001 | Tams et al. |
| 6,282,278 B1 | 8/2001 | Doganata et al. |
| 6,286,029 B1 | 9/2001 | Delph |
| 6,286,043 B1 | 9/2001 | Cuomo et al. |
| 6,289,346 B1 | 9/2001 | Milewski et al. |
| 6,289,389 B1 | 9/2001 | Kikinis |
| 6,292,787 B1 | 9/2001 | Scott et al. |
| 6,301,584 B1 | 10/2001 | Ranger |
| 6,301,621 B1 | 10/2001 | Haverstock et al. |
| 6,304,860 B1 | 10/2001 | Martin, Jr. et al. |
| 6,313,835 B1 * | 11/2001 | Gever et al. ................... 715/846 |
| 6,317,718 B1 | 11/2001 | Fano |
| 6,317,783 B1 | 11/2001 | Freishtat |
| 6,324,538 B1 | 11/2001 | Wesinger, Jr. et al. |
| 6,324,569 B1 | 11/2001 | Ogilvie et al. |
| 6,330,321 B2 | 12/2001 | Detampel, Jr. et al. |
| 6,330,561 B1 | 12/2001 | Cohen et al. |
| 6,330,592 B1 | 12/2001 | Makuch et al. |
| 6,334,132 B1 | 12/2001 | Weeks |
| 6,339,761 B1 | 1/2002 | Cottingham |
| 6,341,353 B1 | 1/2002 | Herman et al. |

| Patent No. | Kind | Date | Inventor | Class |
|---|---|---|---|---|
| 6,345,300 | B1 | 2/2002 | Bakshi et al. | |
| 6,347,398 | B1 | 2/2002 | Parthasarathy et al. | |
| 6,349,257 | B1 | 2/2002 | Liu et al. | |
| 6,349,307 | B1 | 2/2002 | Chen | |
| 6,351,464 | B1 | 2/2002 | Galvin et al. | |
| 6,356,834 | B2 | 3/2002 | Hancock et al. | |
| 6,356,899 | B1 | 3/2002 | Chakrabarti et al. | |
| 6,356,905 | B1 | 3/2002 | Gershman et al. | |
| 6,360,205 | B1 | 3/2002 | Iyengar | |
| 6,360,332 | B1* | 3/2002 | Weinberg et al. | 714/4 |
| 6,366,923 | B1 | 4/2002 | Lenk et al. | |
| 6,377,567 | B1 | 4/2002 | Leonard | |
| 6,377,951 | B1* | 4/2002 | Campbell | 1/1 |
| 6,377,993 | B1 | 4/2002 | Brandt et al. | |
| 6,380,890 | B1 | 4/2002 | Smith et al. | |
| 6,381,592 | B1 | 4/2002 | Reuning | |
| 6,385,595 | B1 | 5/2002 | Kolling et al. | |
| 6,385,655 | B1 | 5/2002 | Smith et al. | |
| 6,397,212 | B1 | 5/2002 | Biffar | |
| 6,405,245 | B1 | 6/2002 | Burson et al. | |
| 6,408,292 | B1 | 6/2002 | Bakalash et al. | |
| 6,412,073 | B1 | 6/2002 | Rangan | |
| 6,421,693 | B1 | 7/2002 | Nishiyama et al. | |
| 6,424,979 | B1 | 7/2002 | Livingston et al. | |
| 6,430,542 | B1 | 8/2002 | Moran | |
| 6,438,580 | B1 | 8/2002 | Mears et al. | |
| 6,442,590 | B1 | 8/2002 | Inala et al. | |
| 6,442,607 | B1 | 8/2002 | Korn et al. | |
| 6,453,339 | B1 | 9/2002 | Schultz et al. | |
| 6,470,383 | B1* | 10/2002 | Leshem et al. | 709/223 |
| 6,473,740 | B2 | 10/2002 | Cockrill et al. | |
| 6,484,155 | B1 | 11/2002 | Kiss | |
| 6,490,601 | B1 | 12/2002 | Markus et al. | |
| 6,493,871 | B1* | 12/2002 | McGuire et al. | 717/173 |
| 6,499,036 | B1 | 12/2002 | Gurevich | |
| 6,499,042 | B1 | 12/2002 | Markus | |
| 6,516,303 | B1 | 2/2003 | Wallman | |
| 6,517,587 | B2 | 2/2003 | Satyavolu et al. | |
| 6,538,673 | B1 | 3/2003 | Maslov | |
| 6,544,295 | B1 | 4/2003 | Bodnar | |
| 6,546,393 | B1 | 4/2003 | Khan | |
| 6,553,359 | B1 | 4/2003 | Schwenkreis | |
| 6,560,639 | B1* | 5/2003 | Dan et al. | 709/218 |
| 6,567,814 | B1 | 5/2003 | Bankler et al. | |
| 6,567,850 | B1 | 5/2003 | Freishtat | |
| 6,572,662 | B2 | 6/2003 | Manohar et al. | |
| 6,594,766 | B2 | 7/2003 | Rangan et al. | |
| 6,601,066 | B1* | 7/2003 | Davis-Hall | 707/5 |
| 6,605,120 | B1* | 8/2003 | Fields et al. | 715/513 |
| 6,606,606 | B2 | 8/2003 | Starr | |
| 6,609,128 | B1 | 8/2003 | Underwood | |
| 6,609,200 | B2 | 8/2003 | Anderson | |
| 6,625,581 | B1 | 9/2003 | Perkowski | |
| 6,631,402 | B1 | 10/2003 | Devine et al. | |
| 6,631,496 | B1 | 10/2003 | Li et al. | |
| 6,633,910 | B1 | 10/2003 | Rajan et al. | |
| 6,643,652 | B2 | 11/2003 | Helgeson et al. | |
| 6,654,761 | B2* | 11/2003 | Tenev et al. | 707/102 |
| 6,665,658 | B1* | 12/2003 | DaCosta et al. | 707/3 |
| 6,694,546 | B1 | 2/2004 | Kasem | |
| 6,697,860 | B1 | 2/2004 | Kung | |
| 6,708,333 | B1* | 3/2004 | Glerum et al. | 717/171 |
| 6,717,376 | B2 | 4/2004 | Lys et al. | |
| 6,718,365 | B1 | 4/2004 | Dutta | |
| 6,725,425 | B1 | 4/2004 | Rajan et al. | |
| 6,732,102 | B1* | 5/2004 | Khandekar | 707/10 |
| 6,745,229 | B1 | 6/2004 | Gobin et al. | |
| 6,754,833 | B1 | 6/2004 | Black et al. | |
| 6,792,082 | B1 | 9/2004 | Levine | |
| 6,792,422 | B1 | 9/2004 | Stride et al. | |
| 6,801,929 | B1 | 10/2004 | Donoho et al. | |
| 6,802,042 | B2 | 10/2004 | Rangan | |
| 6,807,558 | B1 | 10/2004 | Hassett et al. | |
| 6,810,414 | B1 | 10/2004 | Brittain | |
| 6,826,553 | B1* | 11/2004 | DaCosta et al. | 707/1 |
| 6,842,758 | B1* | 1/2005 | Bogrett | 1/1 |
| 6,847,988 | B2 | 1/2005 | Toyouchi et al. | |
| 6,856,415 | B1 | 2/2005 | Simchik et al. | |
| 6,901,394 | B2 | 5/2005 | Chauhan et al. | |
| 6,915,336 | B1 | 7/2005 | Hankejh et al. | |
| 6,915,482 | B2* | 7/2005 | Jellum et al. | 715/511 |
| 6,920,609 | B1 | 7/2005 | Manber et al. | |
| 6,944,660 | B2 | 9/2005 | Eshghi et al. | |
| 6,948,164 | B2* | 9/2005 | Tinker | 717/168 |
| 7,006,993 | B1 | 2/2006 | Cheong et al. | |
| 7,013,310 | B2 | 3/2006 | Messing et al. | |
| 7,082,555 | B2* | 7/2006 | Toyooka et al. | 714/48 |
| 7,085,994 | B2 | 8/2006 | Gvily | |
| 7,085,997 | B1 | 8/2006 | Wu et al. | |
| 7,131,122 | B1* | 10/2006 | Lakhdhir | 717/168 |
| 7,178,096 | B2 | 2/2007 | Rangan et al. | |
| 7,225,249 | B1 | 5/2007 | Barry et al. | |
| 7,249,315 | B2 | 7/2007 | Moetteli | |
| 7,313,813 | B2 | 12/2007 | Rangan et al. | |
| 7,328,176 | B2* | 2/2008 | Tarvydas et al. | 705/26 |
| 7,380,237 | B2* | 5/2008 | Goring et al. | 717/115 |
| 2001/0000537 | A1 | 4/2001 | Inala et al. | |
| 2001/0011341 | A1 | 8/2001 | Hayes, Jr. et al. | |
| 2001/0016034 | A1 | 8/2001 | Singh et al. | |
| 2001/0020237 | A1 | 9/2001 | Yarnall et al. | |
| 2001/0020242 | A1 | 9/2001 | Gupta et al. | |
| 2001/0023414 | A1 | 9/2001 | Kumar et al. | |
| 2001/0032182 | A1 | 10/2001 | Kumar et al. | |
| 2001/0037294 | A1 | 11/2001 | Freishtat et al. | |
| 2001/0051907 | A1 | 12/2001 | Kumar et al. | |
| 2002/0002536 | A1 | 1/2002 | Braco | |
| 2002/0007330 | A1 | 1/2002 | Kumar et al. | |
| 2002/0015480 | A1 | 2/2002 | Daswani et al. | |
| 2002/0019810 | A1 | 2/2002 | Kumar et al. | |
| 2002/0023104 | A1 | 2/2002 | Satyavolu et al. | |
| 2002/0023108 | A1 | 2/2002 | Daswani et al. | |
| 2002/0032782 | A1 | 3/2002 | Rangan et al. | |
| 2002/0059369 | A1 | 5/2002 | Kern et al. | |
| 2002/0073398 | A1* | 6/2002 | Tinker | 717/110 |
| 2002/0078079 | A1 | 6/2002 | Rangan et al. | |
| 2002/0082990 | A1 | 6/2002 | Jones | |
| 2002/0095651 | A1 | 7/2002 | Kumar et al. | |
| 2002/0174006 | A1 | 11/2002 | Rugge et al. | |
| 2003/0120774 | A1 | 6/2003 | Satyavolu et al. | |
| 2003/0126134 | A1 | 7/2003 | Messing et al. | |
| 2003/0191661 | A1 | 10/2003 | Doyle et al. | |
| 2003/0204485 | A1 | 10/2003 | Triggs | |
| 2004/0031030 | A1 | 2/2004 | Kidder et al. | |
| 2004/0078282 | A1 | 4/2004 | Robinson | |
| 2004/0158524 | A1 | 8/2004 | Anderson et al. | |
| 2004/0162778 | A1 | 8/2004 | Kramer et al. | |
| 2004/0236696 | A1 | 11/2004 | Aoki et al. | |
| 2005/0034055 | A1 | 2/2005 | Rangan et al. | |
| 2005/0165651 | A1 | 7/2005 | Mohan | |
| 2005/0210297 | A1 | 9/2005 | Wu et al. | |
| 2006/0116949 | A1 | 6/2006 | Wehunt et al. | |
| 2006/0130046 | A1* | 6/2006 | O'Neill | 717/168 |
| 2006/0253463 | A1 | 11/2006 | Wu et al. | |
| 2006/0253742 | A1* | 11/2006 | Elenburg et al. | 714/38 |

FOREIGN PATENT DOCUMENTS

| | | |
|---|---|---|
| EP | 0786728 | 7/1997 |
| EP | 0848338 | 6/1998 |
| JP | 7074817 | 3/1995 |
| WO | 97/16796 | 5/1997 |
| WO | 97/37314 | 10/1997 |
| WO | 98/28698 | 7/1998 |
| WO | 01/33759 | 5/2001 |

OTHER PUBLICATIONS

Notice of Motion, Motion and Memorandum of Points and Authorities in Support of Defendant Cashedge, Inc.'s Motion for Leave to File First Amended Answer and Counterclaims, U.S. District Court, N.D., California, *Yodlee* v. *Cashedge, Inc.*, Case No. C-05-01550.

Declaration of Jonathan J. Lamberson in Support of Yodlee's Opposition to Cashedge's Motion for Leave to File a First Amended Answer, U.S. District Court, N.D., California, *Yodlee* v. *Cashedge, Inc.*, Case No. C-05-01550.

Yodlee's Opposition to Cashedge's Motion for Leave to File a First Amended Answer, U.S. District Court, N.D., California, *Yodlee* v. *Cashedge, Inc.*, Case No. C-05-01550.

Cashedge's Reply Brief in Support of its Motion for Leave to File First Amended Answer and Counterclaims, U.S. District Court, N.D., California, *Yodlee v. Cashedge, Inc.*, Case No. C-05-01550.
Declaration of Richard M. Koehl in Support of Cashedge's Motion for Leave to File First Amended Answer and Counterclaims, U.S. District Court, N. D., California, *Yodlee v. Cashedge, Inc.*, Case No. C05-01550.
Yodlee's Motion for Leave to File a Sur-reply to Cashedge's Reply Brief in Support of its Motion for Leave to File First Amended Answer and Counterclaims, U.S. District Court, N.D., California, *Yodlee v. Cashedge, Inc.*, Case No. C-05-01550.
Cashedge's Opposition to Yodlee's Motion for Leave to File a Sur-reply, U.S. District Court, N.D., California, *Yodlee v. Cashedge, Inc.*, Case No. C-05-01550.
Declaration of Jonathan J. Lamberson Pursuant to Civil Local Rule 79-5(d) Requesting That Documents Remain Under Seal, U.S. District Court, N.D., California, *Yodlee v. Cashedge, Inc.*, Case No. C-05-01550.
First Amended Answer and Counterclaims; Demand for Jury Trial, U.S. District Court, N. D., California, *Yodlee v. Cashedge, Inc.*, Case No. C-05-01550.
Plaintiff Yodlee, Inc.'s Response to Defendant's First Amended Answer and Counterclaims, U.S. District Court, N.D., California, *Yodlee v. Cashedge, Inc.*, Case No. C-05-01550.
Defendant Cashedge, Inc.'s Notice of Motion, Motion, and Memorandum in Support of Motion for Summary Judgment of Invalidity of the '077 and '783 Patents, U.S. District Court, N.D., California, *Yodlee v. Cashedge, Inc.*, Case No. C-05-01550, 2007.
Yodlee's Opposition to Cashedge's Motion for Summary Judgment of Invalidity of the '077 and '783 Patents, U.S. District Court, N.D., California, *Yodlee v. Cashedge, Inc.*, Case No. C-05-01550, 2007.
Zhao, Y., "A Single Login Web Service Integrator—Web Entrance," Mar. 15, 2004.
Omidyar, P., "Automatic Notification of Web Site Changes," Aug. 30, 1995.
Boeing Chooses NetMind Enterprise Minder to Help Thousands of Employees Track Web-Based Information, PR Newswire, (p. 6426), Nov. 19, 1998.
Sullivan, E., "Caravelle's InfoWatcher 1.1 Keeps an Eye on the Web," PC Week, (p. 33), Jul. 14, 1997.
Cognisoft Announces IntelliServ, A Revolutionary Intranet Information Management Application; A Powerful Solution That Enables the Right Information to Find the Right User at the Right Time, Business Wire, (p. 8140125), Aug. 14, 1996.
FirstFloor and AirMedia Announce Partnership; FirstFloor Smart Delivery to Utilize AirMedia Wireless Technologies, Business Wire, (p. 7291077), Jul. 29, 1997.
Fujitsu Announces Availability of ByeDesk Link for Alpha-Numeric Pages; Next Step in Empowering Mobile Workforces with "Anyplace, Anytime" Information, Business Wire, (p. 7091066), Jul. 9,1998.
Fujitsu Announces "WebAgent" Application as Part of ByeDesk Link Wireless Server Software, Business Wire, (p. 09010210), Sep. 1, 1998.
Fujitsu Picks NetMind for Wireless Web Agent Software, Computergram International, Sep. 2, 1998.
Fujitsu's ByeDesk Link Now Available on the PalmPilot, Business Wire, (p. 1455), Sep. 21, 1998.
GC Tech's GlobeID Payment Internet Commerce Software Supports Microsoft Merchant Server, Business Wire, (p. 1211286), Jan. 21, 1997.
Kravitz, D.W., "Highly Scalable on-Line Payments Via Task Decoupling," Financial Cryptography First International Conference, (p. 355-373), 1997.
Rapoza, J., "Minding Web Site Changes," PC Week, V. 15, No. 37 (p. 32), Sep. 14, 1998.
NetMind Accepts $7 Million StrategiC Investment From Three Prominent VC Firms—BancBoston, SOFTBANK and Draper Fisher Jurvetson, PR Newswire, (p. 7632), Nov. 6, 1998.
NetMind Celebrates Five Million Active Users, PR Newswire, (p. 6488), Dec. 18, 1998.
NetMind Updates the World's Largest Free Web Tracking Service, PR Newswire, (p. 5077), Sep. 18, 1998.
Douglis, F. et al., "The AT&T Internet Difference Engine: Tracking and Viewing Changes on the Web," World Wide Web, 1(1), (pp. 27-44), Jan. 1998.
Ajzenszmidt, I.M., "Versatile Intelligent Agents in Commercial Applications," Dec. 13, 1998.
Zhao, Y., "WebEntree: A Web Service Aggregator," IBM Systems Journal, vol. 37, No. 4, 1998.
Ashish, N. et al., "Optimizing Information Agents by Selectively Materializing Data," American Association for Artificial Intelligence (1998).
Knoblock, C. et al., "Modeling Web Sources for Information Integration," American Association for Artificial Intelligence (1997).
Frank, M. et al., "An Intelligent User Interface for Mixed-Initiative Multi-Source Travel Planning," Information Sciences Institute, University of Southern California. Knoblock, C., "Deploying Information Agents on the Web," University of Southern California, Information Sciences Institute and Computer Science Department, 2001.
Knoblock, C. et al., "The Ariadne approach to Web-based information integration," University of Southern California, Sep./Oct. 1998.
"Online Financial Services Participant Guide", Telephone Services University, 1996.
Quick Reference Handout for Wells Fargo On-Line, Jan. 23, 1996, (18 Pages).
Orbix Programmer's Guide, IONA Technologies, Apr. 1995, (10 Pages).
Trader Implementation with Orbix & ALLBASE (TC talk, Jun. 1994).
Business Wire Article: Wells Fargo Bank is first to offer customers Internet access to bank account balances, May 18, 1995.
"Introduction to Distributed Client/Server Computing With Object Broker," The Cushing Group, Inc., 1994.
"Using CORBA to Integrate Legacy Systems," Presented by Erik S. Townsend, Object World Boston, Mar. 22, 1995.
"The Business Case for Distributed Computing," Presented by Michael L. Ronayne, Object World Boston, May 1996.
"Lessons Learned Deploying Large-Scale Distributed Object Computing Systems," Presented by Michael L. Ronayne, Object World Boston, May 1996.
Birrell, A. et al., "Implementing Remote Procedure Calls," ACM Transactions on Computer Systems, vol. 2, No. 1, (pp. 39-59), Feb. 1984.
Ronayne, M. et al., "Distributed Object Technology at Wells Fargo Bank," The Cushing Group, Inc. (1996).
American Banker Article, "Wells Fargo: Innovations in Customer Management," Nov. 3, 1997.
Edwards, N. et al., "Distributed Objects and the World Wide Web," Abstract; Aug. 24, 1994.
"A Note on Distributed Computing," Sun Microsystems Laboratories, Inc., Nov. 1994.
DeNitto, K., "DCE Means Business," Mar. 20, 1995.
Smith, M., Interview with Bruce MacNaughton Article, Nov. 1996.
Truncale, D., CompuServe Brings NT Online Article, Nov. 1996.
CompuServe Keynote Address Given at Internet@Telecom95, Geneva, Switzerland, Oct. 8, 1995.
Wells Fargo: A Case Study, The Cushing Group, Inc. (1994-1997).
NetBill: An Internet Commerce System Optimized for Network-Delivered Services•, Marvin Sirbu and J.D. Tygar, IEEE Personal Communications, 2:4, Aug. 1995, pp. 34-39.
"Collapsible User Interfaces for Information Retrieval Agents," Martin Frank and Pedro Szekely, Proceedings of the International Conference on Intelligent User Interfaces, Jan. 5-8, 1999, Redondo, CA, pp. 15-22.
"A Softbot-based Interface to the Internet," Oren Etzioni and Daniel Weld, Communicaiton in the ACM, vol. 37, No. 7, Jul. 1994, pp. 72-76.
"Strategic Directions in Database Systems—Breaking Out of the Box," Avi Silberschatz and Stan Zdonik et al., ACM Computing Surveys, vol. 28, No. 4, pp. 764-778, (Dec. 1996).
"Database Security and Privacy," Sushil Jajodia, ACM Computing Surveys, vol. 28, Issue 1, pp. 129-131, (Mar. 1996).
"Managing Security and Privacy of information," Sushil Jajodia, ACM Computing Surveys, vol. 28, Issue 4, (Dec. 1996).

Masao Ito, "producet Review WWW Autopilot Software Narninoriyaro Enterprise", Nikkei Windows NT, No. 19, Nikkei BP, Oct. 1, 1998, pp. 26-28 (JPO CSDB Literature No. National Technical Journal 1998—01804-002.

Masaya Suzuki, "Naminoriyaro Enterprise Ver. 1.0", ASCII NT, vol. 3, No. 10 ASCII Corporation, Oct. 1, 1998, pp. 118-119 (JPO CSDB Literature No. National Technical Journal 1998-01100-010).

Naminoriyaro Plays an Active Role in Small Offices, INTER-NET magazine, No. 44, Impress Corporation, Sep. 1, 1998, p. 237 (JPO CSDB Literature No. National Technical Journal 2000-00181-017).

"Autopilot Software Requires No Waiting Time", ASCII DOS/V Issue vol. 4, No. 10, ASCII Corporation, Oct. 1, 1998, pp. 190-191 (JPO CSDB Literature No. National Technical Journal 1998-01798-011).

"Introduction to Outdoor Network" DOS/V magazine, vol. 6, No. 10, Soft Bank Corporation, May 15, 1997, 993 144-155 (JPO CSDB Literature No. National Technical Journal 1998-01206-003.

Tadatoshi Hirono, "Have a Lead on Active Web Pages! No. 9", Internet ASCII, vol. 3, No. 4 ASCII Corporation, Apr. 1, 1998, pp. 390-391 (JPO CSDB Literature No. National Technical Journal 2000-00394-027).

Kazuya Ishikawa, "What is a "cookie" which you see on WWW browsers?", Internet magazine, No. 39, Impress Corporation, Apr. 1, 1998, 99. 216-217 (JPO CSDB Literature No. National Technical Journal 2000-00176-008).

Jun Nakajima, "Internet Techniques for Beginners No. 9", Interface, vol. 24, No. 9, CQ Publishing Co., Ltd., Sep. 1, 1998, 99. 72-76 (JPO CSDB Literature No. National Technical Journal 1998-01164-001).

Chaum, D. Security without identification: transaction systems to make big brother obsolete. Communication of the ACM. Oct. 1985. vol. 28. Issue 10 pp. 1030-1044.

Chakrabarti et al. Mining the Web's link structure Computer Aug. 1999. pp. 60-67.

Das et al., Experiments in using agent-based retrieval from distributed heterogeneous database, Knowledge and Data Engineering Exchange Works Nov. 1997 abstract'.

Frecon WEBPATH-a three dimensional Web history, Information Visualization IEEE Symposium on Oct. 1998, pp. 3-10.

Park, Intelligent query and browsing information retrieval (QBIR) agent, Acoustics, Speech and Signal Processing, IEEE International Conference May 1998 pp. 1173-1176.

O'Leary, Mick, "NewsWorks, brings new depth to Web news; the site excels with unique sources and value-added editorial features", Information Today v 14 p. 10, 1997.

Stanley, Tracey, "Intelligent Searching Agents on the Web", Jan. 1997, 4 pages, <http://www.ariadne.ac.uk/issue7/search -engines/>.

Jansen, James, "Using an Intelligent Agent to Enhance Search Engine Performance", Dec. 1998, 13 pages, • <http: //www. firstmonday.dk/issues issue2 3/iansen/>.

Lesser, Victor et al., "Big: A Resource_Bounded Information Gathering Agent", Jan. 1998, 18 pages <http://dis.cs.umass.edu/research/big/>.

Severance C. Could LDAP be the next killer DAP? IEEE Computer vol. 30 Issue 8 Aug. 1997, pp. 88-89.

Gardner Stephen R. Building the data warehouse Communications of the ACM vol. 41 Issue 9 Sep. 1998, pp. 52-60.

Bontempo, Charles et al., The IBM data warehouse, Communications of the ACM, vol. 41, Issue 9, Sep. 1998, pp. 38-48.

Fryer et al. (Eds.), Microsoft Computer Dictionary, 1997 3rd Edition, pp. 238-240, 487.

Mollohan, Gary, Wireless Revolution, Appliance. Aug. 1999. vol. 56. No. 8 p. 49.

Anonymous. Dialog file 20 (World Reporter). No. 3629961. 3Com Announces the Pal, VII Connected Organizer, the First Handheld Solution for Out-Of-The-Box Wireless Internet Access. Business Wire. Dec. 2, 1998. 4 pages, especially p. 1, lines 18-33, p. 2, lines 1-10 p. 3, lines 21-30 and p. 4 lines 2-17 and lines 21-24.

Pelline, *LookSmart to be ISP home page*, Web page, unverified print date of Sep. 22, 2000, unverified cover date of Aug. 14, 1997.

Macavinta, *Excite, Lycos get more personal*, Web page, unverified print date of Sep. 22, 2000, unverified cover date of Apr. 13, 1998.

Shiro Iba, "What is it? Explorer File No. 7 'How much is the ease of use of Internet banking?'", SOHO Computing, vol. 3, No. 9, Cybiz Co., Ltd, Jun. 1, 1998, 99 55-60 (JPO CSDB Literature No. National Technical Journal 1998-00782-002).

Unknown, Roboword, Multilingual Dictionary Tool, Jul. 27, 1997, pp. 1-3, all.

Maret et al., Multimedia Information Intechange: Web Forms Meet Date Servers, Jun. 11, 1999, IEEE International Conference, Volumen 2, 499-505.

Armstrong, Robert et al., WebWatcher: A Learning Apprentice for the World Wide Web, School of Computer Science, Carnegie Mellon Univerity, Feb. 1995, pp. 1-7.

Hilbert et al., "Agents for Collecting Application Usage Data Over the Internet," ACM, 1998, pp. 149-156.

Lin et al., "Taking the Byte Out of Cookies," Computer and Society, Jun. 1998, pp. 39-51.

F. Kilander, "A Brief Comparison of News Filtering Software", Department of Computer and Systems Sciences, 1995, pp. 1-13.

K. Sycara et al., "Distributed Intelligent Agents", The Robotics Institue, Carnegie Mellon University, 1996, pp. 1-32.

W3C's, "HTML 4.0 Specification, " Apr. 24, 1998, http://www.w3.org/TR/1998/REC-html40-19980424/, pp. 1-27.

* cited by examiner

*Fig. 4 (Cobrand Architecture)*

Change Detection Software

METHOD AND APPARATUS FOR DETECTING CHANGES IN WEBSITES AND REPORTING RESULTS TO WEB DEVELOPERS FOR NAVIGATION TEMPLATE REPAIR PURPOSES

CROSS-REFERENCE TO RELATED DOCUMENTS

The present invention is a continuation-in-part (CIP) to a U.S. patent application Ser. No. 09/639,346 entitled "Method and Apparatus for Tracking Functional States of a Web-Site and Reporting Results to Web Developers", Filed on Aug. 15, 2000, which is a (CIP) to a U.S. patent application Ser. No. 09/573,699 entitled "Method and Apparatus for Cobranding Portal Services and Normalizing Advertisements Delivered to Cobrand Subscribers", Filed on May 19, 2000, which is a CIP to a U.S. patent application Ser. No. 09/208,740 entitled "Method and Apparatus for Providing and Maintaining a User-Interactive Portal System Accessible Via Internet or Other Switched-Packet-Network", Filed on Dec. 8, 1998, disclosures of which are incorporated herein in their entirety by reference.

FIELD OF THE INVENTION

The present invention is in the field of Internet navigation and data communication, and pertains more particularly to methods and apparatus for detecting Website changes and reporting the information to website developers.

BACKGROUND OF THE INVENTION

The information network known as the World Wide Web (WWW), which is a subset of the well-known Internet, is arguably the most complete source of publicly accessible information available. Anyone with a suitable Internet appliance such as a personal computer with a standard Internet connection may access (go on-line) and navigate to information pages (termed web pages) stored on Internet-connected servers for the purpose of garnering information and initiating transactions with hosts of such servers to and pages.

Many companies offer various subscription services accessible via the Internet. For example, many people now do their banking, stock trading, shopping, and so forth from the comfort of their own homes via Internet access. Typically, a user, through subscription, has access to personalized and secure WEB pages for such functions. By typing in a user name and a password or other personal identification code, a user may obtain information, initiate transactions, buy stock, and accomplish a myriad of other tasks.

One problem that is encountered by an individual who has several or many such subscriptions to Internet-brokered services is that there are invariably many passwords and/or log-in codes to be used. Often a same password or code cannot be used for every service, as the password or code may already be taken by another user. A user may not wish to supply a code unique to the user such as perhaps a social security number because of security issues, including quality of security, that may vary from service to service. Additionally, many users at their own volition may choose different passwords for different sites so as to have increased security, which in fact also increases the number of passwords a user may have.

Another issue that can plague a user who has many passworded subscriptions is the fact that they must bookmark many WEB pages in a computer cache so that they may quickly find and access the various services. For example, in order to reserve and pay for airline travel, a user must connect to the Internet, go to his/her book-marks file and select an airline page. The user then has to enter a user name and password, and follow on-screen instructions once the page is delivered. If the user wishes to purchase tickets from the WEB site, and wishes to transfer funds from an on-line banking service, the user must also look for and select the personal bank or account page to initiate a funds transfer for the tickets. Different user names and passwords may be required to access these other pages, and things get quite complicated.

Although this preceding example is merely exemplary, it is generally known that much work related to finding WEB pages, logging in with passwords, and the like is required to successfully do business on the WEB.

A system known to the inventor and described in the cross-reference section above provides an interactive Internet portal that enables users to store their WEB pages, user names, passwords, and a system that performs pre-defined tasks such as navigation and interaction between WEB servers based on user pre-programming (user profiles). Such a system greatly simplifies on-line or network-based business transactions.

It is known in the art that certain providers of Web services often work with partners representing other companies offering similar services. These partnerships are termed cobrand partnerships in the art.

An example of a cobrand relationship would be that of a company A offering services through a company B to subscribers of company B as if the added services were provided and maintained by company B, but in reality are provided by company A. In a typical case of cobranding, subscribers to the cobrand partner are not aware that the added services are actually provided by a company other than the cobrand partner, or in this case, company A.

A problem with cobranding services in prior art involves the amount of cooperation, engineering, configuration, and so on that must be performed by both the service-providing company and the cobrand partner. For example, knowledge workers from both companies must interface and cooperate in order to provide a functional interface and mechanism for subscribers of the cobrand partner to utilize in order to receive the extra value-added services.

A software utility is known to the inventor for creating and configuring a cobrand service package. Such a utility is taught in the co-related application Ser. No. 09/573,699, entitled "Method and Apparatus for Cobranding Portal Services and Normalizing Advertisements Delivered to Cobrand Subscribers, listed in the cross-reference section. This software utility comprises a function for installation and execution of the utility, a function for importing external data for use in the utility, a function for browsing and selecting functional services offered from within the utility, a function for constructing information pages, the information pages containing the imported external data and hyperlinks to the selected functional services, and a function for saving and submitting a configured utility to an entity for installation. The software utility is a self-contained utility, which upon completion functions as a service installation template for installing a cobrand service. By using the utility described above cobranded services may be efficiently implemented at Websites allowing added interaction capability and other services to existing Websites.

In addition to cobrand relationships, there exists on the Internet many popular service sites maintained by service-providing companies that are patronized by many users, thus indicating a wide popularity among users. Providing access to such popular Web locations and their services without requiring a user to physically navigate to the location is one of the primary goals of the inventor and is realized through a novel navigation sub-system that may be executed on behalf of a user according to user request. The navigation system executes according to machine-readable scripting, which provides such functionality as auto-log-in, automated form filling and submission, data gathering and summarization, navigation to secondary sites linked to a main site, and so on.

In order to provide such services through the portal system taught in disclosure included herein and referenced under the cross-reference section, an agreement must be forged between the company hosting the portal service and the company hosting a popular service site. Such an agreement, while not specifically a cobrand agreement, allows subscribers of portal services to access services of a popular site without being required to physically navigate to the site.

In order to implement proxy service access to popular Web locations, information is required from the particular location being added. Likewise, continuing information updates must be obtained from added sites in order that error-free access may be maintained over time. Such information may include data pertaining to the structure of a site, content of a site, site address, any added media functions to a site, and so on. Keeping apprised of current and up-to-date site revisions or changes presents a challenge to Web developers charged with implementing and maintaining proxy service-access to such sites, especially so, when there are many added sites.

One way to handle site revisions and other site changes is to allow Web-developers associated with a proxy service sole authorization to revise, add to, or otherwise alter a site. This may be practiced to insure that no changes are added which conflict with written scripts for accessing services, or at least without new scripts being written or old ones being revised to accommodate the site changes. However, this solution is an impractical one for a variety of reasons. One is that Web-developers specifically charged with maintaining popular sites are not likely to cooperate with those from a proxy service as they know best what their respective companies wish to do with a particular site in terms of construction and alteration. Allowing entities from an outside company to be the sole facilitators of a particular site, even with instruction provided by developers specific to the site in to question is generally not desired, even in exchange for sending clients to their services by proxy.

An alternative requires that Web-developers working to provide proxy services for a particular site continually monitor the site for additions, revisions, address changes, structure changes, and so on to insure that proxy services may continue on an ongoing basis in an un-interrupted fashion. One with skill in the art will recognize that if a developer is charged with maintaining proxy services to many sites, he or she may be considerably back-logged with tasks that are overdue. In the interim, proxy services to particular sites may be delayed for long periods.

A software tool is known to the inventor for automatically tracking activities related to the status and usage statistics of a plurality of Websites on a data packet network. Such a tool is taught in the co-related application Ser. No. 09/639,346, entitled "Method and Apparatus for Tracking Functional States of a Web-Site and Reporting Results to Web Developers", listed in the cross-reference section. This software tool comprises a network communication capability for establishing network communication between the software tool and the tracked Websites; a plurality of data-reporting modules for obtaining and reporting data about tracked Websites; a data input function for excepting data from the reporting modules and from external sources; a data recording function for recording and logging the data received from the reporting modules and from the external sources; and a data management function for organizing and storing the received data and rendering the data accessible for use in software development. A software engineer or developer accesses the site-tracking software and connected database through a Web browser from a network-connected workstation in order to utilize data mined from Websites for the purpose of creating routines enabling automated navigation and site manipulation by proxy for subscribed users.

The system described above provides a more efficient method for managing web-site errors and changes that may occur in automated Websites. However, cooperation from the Websites themselves is still required in order to implement the various data-reporting modules taught. Moreover, database mining by developers for the purpose of discovering errors and changes as well as for adding new sites is still rather extensive.

It is taught in the priority documents related to this specification that proxy navigation and interaction is performed by a navigation sub-system taking instruction from machine-readable templates. Each template contains all of the required navigation and site-logic, as well as any required login, form filling, or other interaction logic needed to perform whatever tasks are ordered. In this sense, an instruction template for navigation, also termed a job-order, may vary considerably from another job-order containing a same Web site. For example, specific site logic may differ for a same URL wherein there are a variety of optional tasks that may be performed. Likewise, some job-orders (templates) will contain only one specific site-logic block if there is only one function performed at the site on behalf of all users. In yet another aspect, orders that encompass more than one site to navigate to may one or more site-logics in common, but in a different order of navigation and application.

With the types of complexities described above, it is desired to modularize templates so that specific blocks of templates such as site logic blocks may be easily replaced should they become non-functional. Furthermore, it is desired that Web-site changes may be detected by methods that require less cooperation from site-hosts.

What is clearly needed is a method and apparatus that enables automated Web site change detection and template repair without to unnecessarily involving Web-site hosts and without extensive labor incurred by program developers. Such a system would streamline automated proxy navigation and interaction for both clients and the service provider.

SUMMARY OF THE INVENTION

In a preferred embodiment of the present invention, a software application for enabling automated notification of applied structural changes to electronic information pages hosted on a data-packet-network is provided. The software application comprises, a developer-interface module for enabling developers to build and modify navigation templates using functional logic blocks, a navigation system-interface module for integrating the software application to a proxy-navigation system for periodic execution of the templates, a change-notification module for indicating a point in process where a navigation routine has failed and for creating a data file containing parameters associated with the failed navigation routine, and a database-interface module for interfacing the software application to a data repository for storing the data file. The software application periodically submits test navigation and interaction routines to the navigation system for execution by virtue of it's interface with the navigation system. Upon failure of a test routine, the software application system creates the data file. The data file, comprises a point-of-failure indication within the failed navigation routine, an identifier of the associated electronic information page subjected to the navigation routine, and a brief description of the cause of failure. The software application stores the data file in the data repository sending notification of the action to the developer.

In a preferred embodiment, the software application is an Internet-based application executing and running on an Internet server. In this aspect, the software application is accessible through a network-browser application. In this aspect, the functional logic blocks include site-logic blocks, automated site-login blocks, and automated site-registration blocks. In preferred aspects the navigation templates are test routines executed for the purpose of determining success or failure of the routine. The navigation templates are executable instruction orders containing the logic blocks. Furthermore, the functional logic blocks are modular and self-installable within the navigation templates.

In all aspects, the data files are human readable and are accessed by developers for the purpose of affecting updating of the navigation templates. In a preferred application, the developers access the application through individual computerized workstations. In one embodiment, the error notification and data-file creation processes performed in association with a test template are also performed in the event of failure of a client's personalized navigation template.

In another aspect of the present invention, a change-notification system for detecting structural changes applied to electronic information pages hosted on a data-packet-network is provided. The change notification comprises a software application installed on a network-connected processor, the software application enabling developers to construct and cause execution of navigation templates and enabling failed instances of navigation executed on the network to be reported, a server system connected to the network, the server system hosting a proxy-navigation software application for executing the navigation templates, the navigation software accessible through the software application, a data repository accessible to the server system and to the software application, the data repository storing information about clients and result information about the failed navigation routines, the result information supplied by the software application, and a plurality of network-connected nodes having network access to the software application and to the data repository.

In preferred embodiments, network access of the software application is practiced by developers operating the network-connected nodes for the purpose of building and causing execution of the navigation templates, the templates used to test the current structural states of electronic information pages hosted on the network. The software application notifies of failure instances of the executed navigation routines. The failure instances are logged into the database.

In a preferred embodiment, the system is implemented on the Internet network. In this aspect, the network-connected processor hosting the software application is an Internet-connected server. In one aspect, the server system hosting the proxy navigation software also hosts the software application. In another aspect, the server system contains a single server hosting both the proxy navigation software and the software application. In still another aspect, the software application and the proxy navigation software are integrated as a single application enabling both functions of navigating according to navigation templates and notifying and recording failed instances of navigation.

In another aspect of the present invention, a method for receiving notification of random structural changes applied to electronic information pages accessed by a proxy navigation system and effecting updates to navigation templates based on the change information is provided. The method comprises the steps of, (a) establishing notification of a failed navigation routine executed for the purpose of navigating to and through an electronic information page, (b) recording an instance of the failed routine including parameters associated with the cause of failure, (c) accessing the recorded instance of the failed routine for review purposes, (d) navigating to the electronic information page identified in the recorded instance, (e) accessing source information associated with electronic information page identified in the recorded instance, (f) creating new logic according to the source information and according to information contained in the recorded instance, and (g) installing the new logic into existing navigation templates that depend on the updated information for successful function.

In a preferred embodiment the method is practiced on the Internet network and the electronic information page is a web page hosted on the network. In one aspect of the method in step (a), the navigation routine is performed according to a test navigation template created for the purpose.

In another aspect of the method in step (a), the navigation routine is performed according to a client navigation template executed to perform services for the client. In all aspects of the method in step (b), the recorded instance of a failed routine is created in the form of a data file and stored in a data repository accessible through the network. In step (c), the recorded instance of the failed navigation routine is, in preferred application, accessed by a human software developer.

In all applications of the method, in step (d), navigation is performed by the developer utilizing an instance of browser software installed on a computerized workstation. In another aspect, in step (f), the new logic is created in the form of a modular logic block installable to navigation templates. In preferred aspect, in step (g), the new logic block self-installs to a depended navigation template. In one aspect of the method, in step (g) more than one new logic block is created for a single navigation template. In a further aspect of the method, a step is added between steps (f) and (g) for testing the new logic before implementation.

Now, for the first time, a method and apparatus that enables automated website change detection and template repair without unnecessarily involving website hosts and without extensive labor incurred by program developers is provided. Such a system streamlines automated proxy navigation and interaction for both clients and the service provider.

BRIEF DESCRIPTION OF THE DRAWING FIGURES

DESCRIPTION OF THE PREFERRED EMBODIMENTS

According to a preferred embodiment of the present invention, a unique Internet portal is provided and adapted to provide unique services to users who have obtained access via an Internet or other network connection from an Internet-capable appliance. Such an interface provides users with a method for storing many personal WEB pages and further provides search function and certain task-performing functions. The methods and apparatus of the present invention are taught in enabling detail below.

Figure 1:
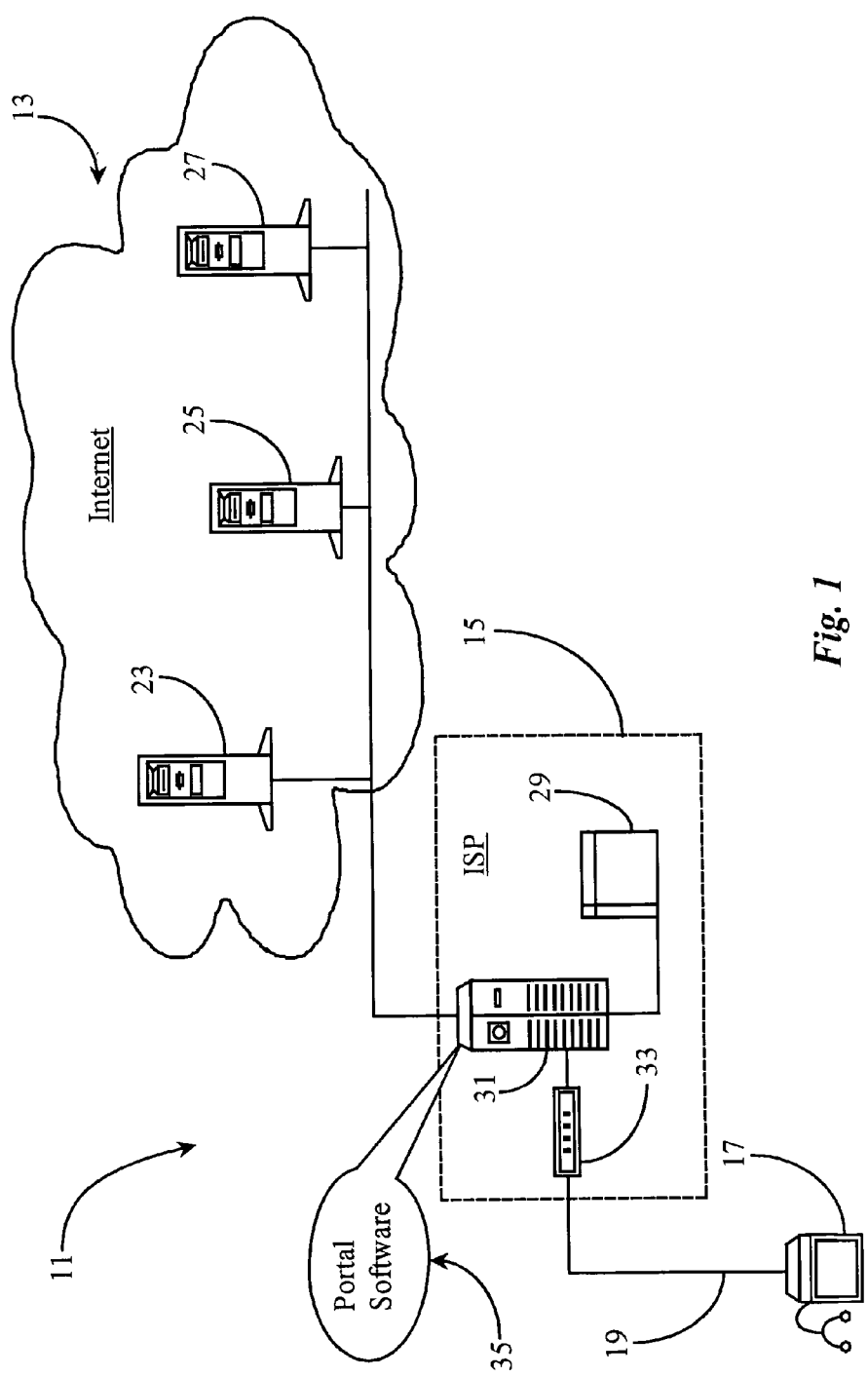
FIG. 1 is an overview of an Internet portal-system and network according to an embodiment of the present invention.

FIG. 1 is an overview of an Internet portal system 11 and Internet network 13 according to an embodiment of the present invention. Portal system 11, in this embodiment, operates as an ISP in addition to a unique network portal, but may, in other embodiments be implemented as a stand-alone Internet server. In yet other embodiments the service and apparatus described herein may also be provided by such as a search and listing service (AltaVista™, Yahoo™) or by any other enterprise hosting a WEB-connected server.

Internet 13 is representative of a preferred use of the present invention, but should not be considered limiting, as the invention could apply in other networks and combinations of networks.

ISP 15 in this embodiment comprises a server 31, a modem bank 33, represented here by a single modem, and a mass storage repository 29 for storing digital data. The modem bank is a convenience, as connection to the server could be by another type of network link. ISP 15, as is typical in the art, provides Internet access services for individual subscribers. In addition to well-known Internet access services, ISP 15 also provides a unique subscription service as an Internet portal for the purpose of storing many WEB pages or destinations along with any passwords and or personal codes associated with those pages, in a manner described in more detail below. This unique portal service is provided by execution of Portal Software 35, which is termed by the inventors the Password-All suite. The software of the invention is referred to herein both as the Portal Software, and as the Password-all software suite. Also, in much of the description below, the apparatus of the invention is referred to by the Password-All terminology, such as the Password-All Server or Password-All Portal.

ISP 15 is connected to Internet 13 as shown. Other equipment known in the art to be present and connected to a network such as Internet 13, for example, IP data routers, data switches, gateway routers, and the like, are not illustrated here but may be assumed to be present. Access to ISP 15 is through a connection-oriented telephone system as is known in the art, or through any other Internet/WEB access connection, such as through a cable modem, special network connection (e.g. T1), ISDN, and so forth. Such connection is illustrated via access line 19 from Internet appliance 17 through modem bank 33.

In a preferred embodiment a user has access to Internet Password-All Portal services by a user name and password as is well-known in the art, which provides an individualized WEB page to the subscriber. In another embodiment wherein a user has other individuals that use his or her Internet account, then an additional password or code unique to the user may be required before access to portal 31 is granted. Such personalized Portal WEB pages may be stored in repository 29, which may be any convenient form of mass storage.

Three Internet servers 23, 25, and 27, are shown in Internet 13, and represent Internet servers hosted by various enterprises and subscribed to by a user operating appliance 17. For example, server 23 may be a bank server wherein interactive on-line banking and account managing may be performed. Server 25 may be an investment server wherein investment accounts may be created and managed. Server 27 may be an airline or travel server wherein flights may be booked, tickets may be purchased, and so on. In this example, all three servers are secure servers requiring user ID and password for access, but the invention is not necessarily limited to just secure services.

In a preferred embodiment of the present invention, a subscribing user operating an Internet-capable appliance, such as appliance 17, connects to Password-All Portal system 11 hosted by ISP 15, and thereby gains access to a personalized, interactive WEB page, which in turn provides access to any one of a number of servers on Internet 13 such as servers 23, 25, and 27, without being required to enter additional passwords or codes. In a preferred embodiment the software that enables this service is termed Password-All by the inventors. Password-All may be considered to be a software suite executing on the unique server, and in some instances also on the user's station (client). Additional interactivity provided by portal software 35 allows a connected user to search his listed pages for information associated with keywords, text strings, or the like, and allows a user to program user-defined tasks involving access and interaction with one or more Internet-connected servers such as servers 23, 25, and 27 according to a pre-defined time schedule. These functions are taught in enabling detail below.

Figure 2:
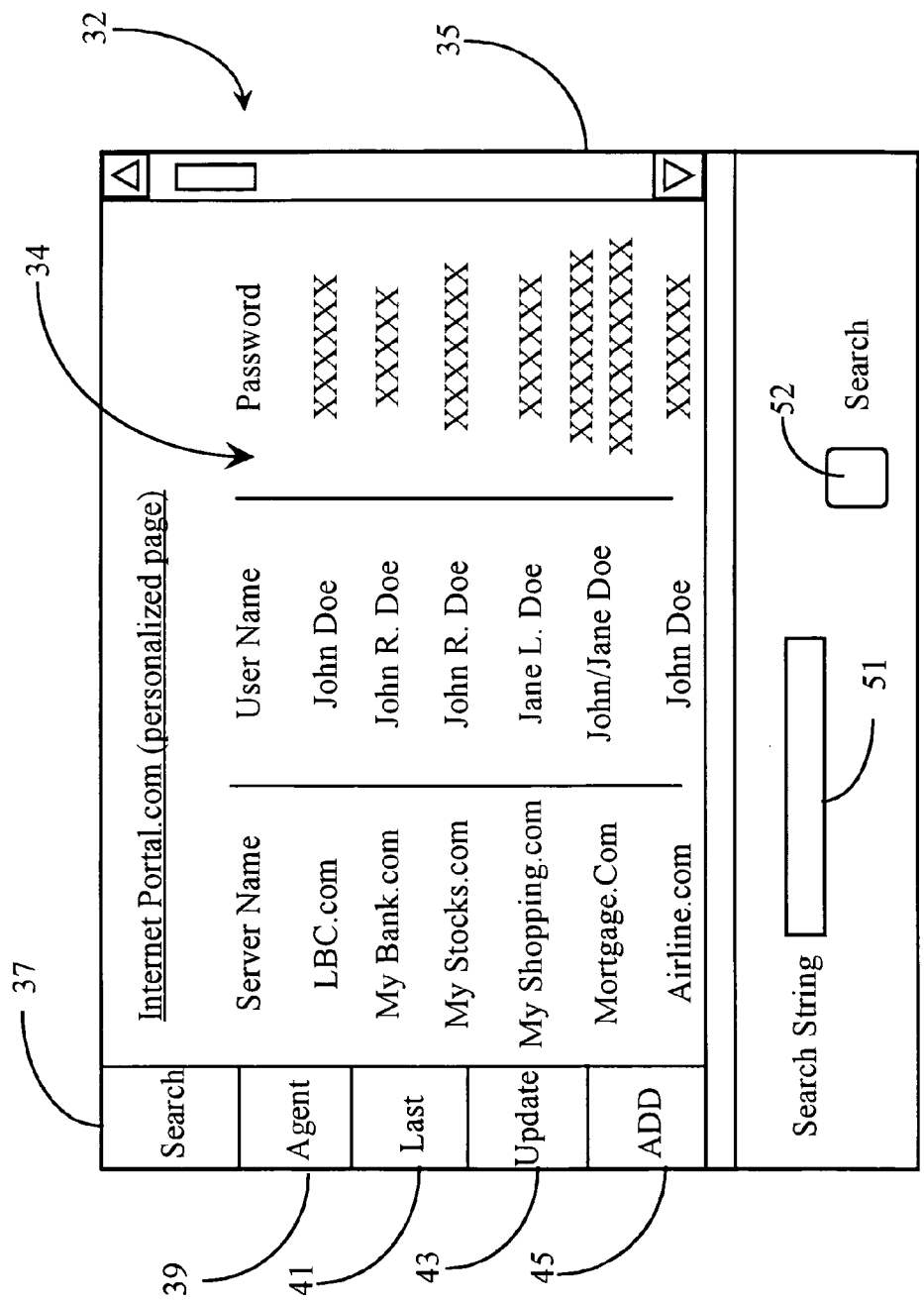
FIG. 2 is an exemplary plan view of a personalized Portal home page application as it may be seen on a display monitor according to an embodiment of the present invention.

FIG. 2 is an illustration of a personalized portal page as may be seen on a display monitor according to an embodiment of the present invention, provided by Password-All Portal software 35 executing on server 31, in response to secure access by a subscriber. Page 32 presents an interactive listing 34 of user-subscribed or member WEB pages, identified in this example by URL, but which may also be identified by any convenient pseudonym, preferably descriptive, along with user name and typically encrypted password information for each page. Listed in a first column under destination, are exemplary destinations LBC.com, My Bank.com, My Stocks.com, My shopping.com, Mortgage.com, and Airline.com. These are but a few of many exemplary destinations that may be present and listed as such on page 33. In order to view additional listings listed but not immediately viewable from within application 33, a scroll bar 35 is provided and adapted to allow a user to scroll up or down the list to enable viewing as is known in the art.

Items listed in list 34 in this example may be considered destinations on such as servers 23, 25, and 27 of FIG. 1. Typically the URL associated with an item on this list will not take a user to a server, per se, but to a page stored on a server. User names and password data associated with each item in list 34 are illustrated in respective columns labeled user name, and password, to the right of the column labeled destination. Each listing, or at least a portion of each listing, is a hyperlink invoking, when selected, the URL to that destination. In some instances a particular service may have more than one associated URL. For example, My Bank.com may have more than one URL associated for such as different accounts or businesses associated also with a single subscriber. In this case there may be a sub-listing for different destinations associated with a single higher-level listing. This expedient is not shown, but, given this teaching the mechanism will be apparent to those with skill in the art.

In some embodiments one page 33 may be shared by more than one user, such as a husband and wife sharing a common account and subscription. An instance of this is illustrated herein with respect to the server labeled Mortgage.com wherein both a John and a Jane Doe are listed together under the column labeled user name. In another embodiment, a network of individuals, perhaps business owners, authorized co-workers, investment parties, or the like may share one application. In this way, system 11 may be adapted for private individuals as well as business uses.

After gaining access to application 33 which is served via Internet portal server 31 of FIG. 1, a user may scroll, highlight, and select any URL in his or her list 34 for the purpose of navigation to that particular destination for further interaction. Application 33 already has each password and user name listed for each URL. It is not necessary, however, that the password and user name be displayed for a user or users. These may well be stored transparently in a user's profile, and invoked as needed as a user makes selections. Therefore, a user is spared the need of entering passwords and user names for any destinations enabled by list 34. Of course, each list 34 is built, configured and maintained by a subscribing user or users, and an editing facility is also provided wherein a user may edit and update listings, including changing URL's adding and deleting listings, and the like.

In another aspect of the invention new listings for a user's profile, such as a new passthrough to a bank or other enterprise page, may be added semi-automatically as follows: Typically, when a user opens a new account with an enterprise through interaction with a WEB page hosted by the enterprise, the user is required to provide certain information, which will typically include such as the user's ID, address, e-mail account, and so forth, and typically a new user name and password to access the account. In this process the user will be interacting with the enterprise's page from his/her browser. A Password-All plug-in is provided wherein, after entering the required information for the new enterprise, the user may activate a pre-determined signal (right click, key stroke, etc.), and the Password-All suite will then enter a new passthrough in the user's Password. All profile at the Password-All Portal server.

In a related method for new entries, the enterprise hosting the Password-All Portal may, by agreement with other enterprises, provide log-in and sign-up services at the Password-All Portal, with most action transparent to the user. For example, there may be, at the Password-All Portal, a selectable browser list of cooperating enterprises, such as banks, security services, and the like, and a user having a Password-All Portal subscription and profile may select among such cooperating enterprises and open new accounts, which will simultaneously and automatically be added to the Password-All Portal page for the user and to the server hosted by the cooperating enterprise. There may be some interactivity required for different accounts, but in the main, much information from the user's profile may be used directly without being re-entered.

The inventors have anticipated that many potential users may well be suspicious of providing passwords and user names to an enterprise hosting a Password-All Portal Server executing a service like Password-All according to embodiments of the present invention. To accommodate this problem, in preferred embodiments, it is not necessary that the user provide the cleartext password to Password-All. Instead, an encrypted version of each password is provided. When a user links to his passthrough page in Password-All at the Password-All Portal server, when he/she invokes a hyperlink, the encrypted password is returned to the user's system, which then, by virtue of the kept encryption key or master password, invokes the true and necessary password for connection to the selected destination. It is thus not necessary that cleartext passwords be stored at the Password-All Portal server, where they may be vulnerable to attack from outside sources, or to perceived misuse in other ways as well.

In a related safety measure, in a preferred embodiment of the invention, a user's complete profile is never stored on a single server, but is distributed over two or more, preferably more, servers, so any problem with any one server will minimize the overall effect for any particular user.

Password-All, as described above, allows a user to access a complete list of the user's usual cyberspace destinations, complete with necessary log-on data, stored in an encrypted fashion, so a user may simply select a destination (a hyperlink) in the Password-All list, and the user's browser then invokes the URL for the selected destination. In an added feature, Password-All may display banner ads and other types of advertisement during the navigation time between a hyperlink being invoked and the time the destination WEB page is displayed.

In yet another embodiment of the invention, a user/subscriber need not access the Password-All page to enjoy the advantages of the unique features provided. In this variation, a Plug-In is provided for the subscriber's WEB browser. If the subscriber navigates by use of the local browser to a WEB page requiring a secure log-in, such as his/her on-line banking destination, when the subscriber is presented with an input window for ID and Password, the plug in may be activated by a predetermined user input, such as a hot key or right click of the mouse device. The plug-in then accesses, transparently, the Password-All page (which may be cached at the client), and automatically accesses and provides the needed data for log-on.

In yet another aspect of the invention a search option 37 allows a user to search list 34 for specific URL's based on typed input such as keywords or the like. In some cases, the number of URL's stored in list 34 can be extensive making a search function such as function 37 an attractive option. A criteria dialog box 51 illustrated as logically separated from and below list 34 is provided and adapted to accept input for search option 37 as is known in the art. In one embodiment, search option 37 may bring up a second window wherein a dialog box such as box 51 could be located.

In another aspect of the invention the search function may also be configured in a window invoked from window 33, and caused to search all or selected ones of listed destinations, and to return results in a manner that may be, at least to some extent, configured by a user. For example, a dialog box may be presented wherein a user may enter a search criteria, and select among all of the listed destinations. The search will then be access each of the selected destinations in turn, and the result may be presented to the user as each instance of the criteria is found, or results may be listed in a manner to be accessed after the search.

Preferably the search function is a part of the Password-All Portal software, available for all users, and may be accessed by hyperlinks in user's personal pages. In some embodiments users may create highly individualized search functions that may be stored in a manner to be usable only by the user who creates such a function.

In many aspects of the present invention a knowledge of specific WEB pages, and certain types of WEB pages, is highly desirable. In many embodiments characteristics of destination WEB pages are researched by persons (facilitators) maintaining and enhancing Password-All Portal software 35, and many characteristics may be provided in configuration modules for users to accomplish specific tasks. In most cases these characteristics are invoked and incorporated transparent to the user.

In yet another aspect of the present invention, the Password-All suite is structured to provide periodic reports to a user, in a manner to be structured and timed by the user, through the user's profile. For example, reports of changes in account balances in bank accounts, stock purchases, stock values, total airline travel purchases, frequent-flier miles, and the like may be summarized and provided to the users in many different ways. Because the Password-All Portal server with the Password-All software site handles a broad variety of transactional traffic for a user, there is an opportunity to summarize and collect and process statistics in many useful ways. In preferred embodiments of the invention such reports may be furnished and implemented in a number of different ways, including being displayed on the user's secure personal WEB page on the Password-All Portal.

In addition to the ability of performing tasks as described above, task results including reports, and hard documents such as airline tickets may be sent over the Internet or other data packet-networks to user-defined destinations such as fax machines, connected computer nodes, e-mail servers, and other Internet-connected appliances. All tasks may be set-up and caused to run according to user-defined schedules while the user is doing something else or is otherwise not engaged with the scheduled task.

In another embodiment of the present invention, recognizing the increasing use of the Internet for fiscal transactions, such as purchasing goods and services, a facility is provided in a user's profile to automatically track transactions made at various destinations, and to authorize payment either on a transaction-by-transaction basis, or after a session, using access to the user's bank accounts, all of which may be pre-programmed and authorized by the user.

Other functions or options illustrated as part of application 35 include a last URL option 41, an update function 43, and an add function 45. Function 41 allows a user to immediately navigate to a last visited URL. Update function 43 provides a means of updating URL's for content and new address. An add function enables a user to add additional URL's to list 34. Similarly, function 45 may also provide a means to delete entries. Other ways to add accounts are described above. It should be noted that the services provided by the unique Password-All Portal in embodiments of the present invention, and by the Password-All software suite are not limited to destinations requiring passwords and user names. The Password-All Portal and software in many embodiments may also be used to manage all of a user's bookmarks, including editing of bookmarks and the like. In this aspect, bookmarks will typically be presented in indexed, grouped, and hierarchical ways.

There are editing features provided with Password-All for adding, acquiring, deleting, and otherwise managing bookmarks. As a convenience, in many embodiments of the invention, bookmarks may be downloaded from a user's Password-All site, and loaded onto the same user's local browser. In this manner, additions and improvements in the bookmark set for a user may be used without the necessity of going to Password-All. Further, bookmarks may be uploaded from a user's local PC to his/her home page on the Password-All site by use of one or more Password-All plug-ins.

It will be apparent to the skilled artisan, given the teaching herein, that the functionality provided in various embodiments of the invention is especially applicable to Internet-capable appliances that may be limited in input capability. For example, a set-top box in a WEB TV application may well be without a keyboard for entering IDs and Passwords and the like. In practice of the present invention keyboard entry is minimized or eliminated. The same comments apply to many other sorts of Internet appliances.

In preferred embodiments of the invention, once a subscriber-user is in Password-All, only an ability to point-and-click is needed for all navigation. To get into the Password-All site, using a limited apparatus, such as an appliance without a keyboard or keypad, a Smartcard or embedded password may be used, or some other type of authentication.

It will be apparent to one with skill in the art that an interactive application such as application 33 may be provided in a form other than a WEB page without departing from the spirit and scope of the present invention. For example, an application such as application 33 may be provided as a downloadable module or program that may be set-up and configured off-line and made operational when on-line.

Figure 3:
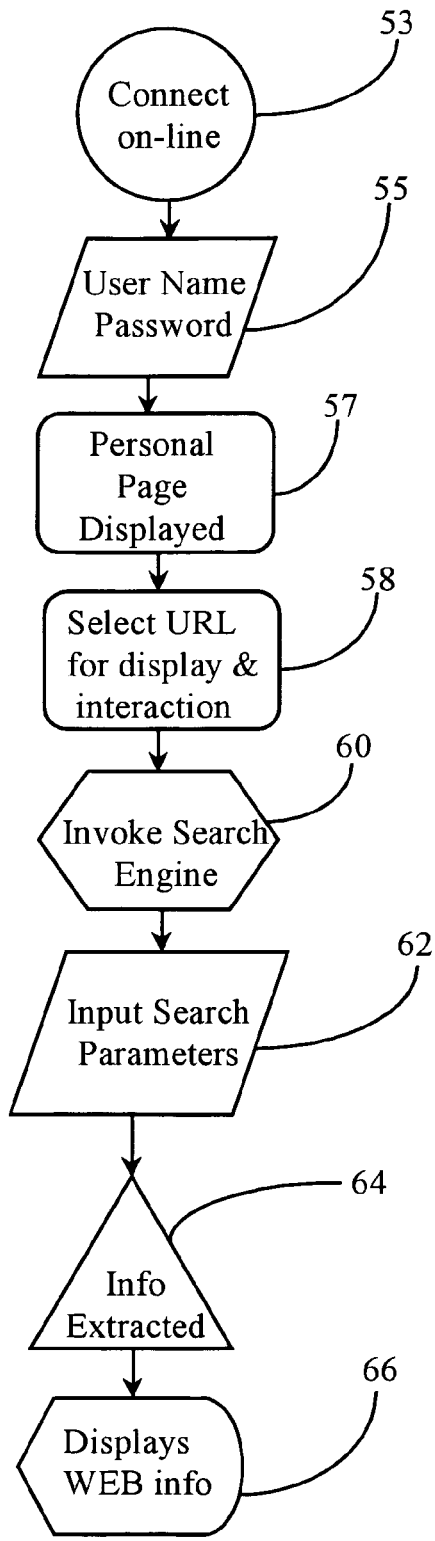
FIG. 3 is a flow diagram illustrating user interaction with the Internet portal of FIG. 1.

FIG. 3 is a flow diagram illustrating user interaction with the Internet Password-All Portal of FIG. 1. The following process steps illustrated, according to an embodiment of the present invention, are intended to illustrate exemplary user-steps and automated software processes that may be initiated and invoked during interaction with an Internet portal of the present invention such as portal 31 of FIG. 1. In step 53 a user connects to the Internet or another previously described switched-packet network via a compatible appliance such as Internet appliance 17 of FIG. 1.

At step 55, a user enters a user-name and password which, in one embodiment, may simply be his ISP user name and password. In another embodiment, a second password or code would be required to access an Internet portal such as portal server 31 of FIG. 1 after logging onto the Internet through the ISP. In some cases, having a special arrangement with the ISP, there may be one password for both Internet access through the ISP and for Password-All. At step 57 a personal WEB page such as page 32 of FIG. 2 is displayed via Internet portal server 31. At minimum, the personalized WEB page will contain all user configured URL's, and may also be enhanced by a search function, among other possibilities.

In step 58 a user will, minimally, select a URL from his or her bookmarked destinations, and as is known by hyperlink technology, the transparent URL will be invoked, and the user will navigate to that destination for the purpose of normal user interaction. In this action, the Password-All Portal software transparently logs the user on to the destination page, if such log-on is needed.

At step 60 the user invokes a search engine by clicking on an option such as described option 37 of FIG. 2. At step 62, the user inputs search parameters into a provided text field such as text field 51 of FIG. 2. After inputting such parameters, the user starts the search by a button such as button 52. The search engine extracts information in step 64. Such information may be, in one option, of the form of URL's fitting the description provided by search parameters. A searched list of URL's may be presented in a separate generated page in step 66 after which a user may select which URL to navigate to. In an optional search function, the user may provide search criteria, and search any or all of the possible destinations for the criteria.

In another embodiment wherein WEB pages are cached in their presentable form, information extracted in step 64 may include any information contained in any of the stored pages such as text, pictures, interactive content, or the like. In this case, one displayed result page may provide generated links to search results that include the URL associated with the results. Perhaps by clicking on a text or graphic result, the associated WEB page will be displayed for the user with the result highlighted and in view with regards to the display window.

Distributed CoBrand Application

According to an embodiment of the present invention, a cobrand architecture 67 is provided and adapted to enable efficient cobranding between a service provider and multiple cobrand partners. Architecture 67 comprises a mix of elements, which are known in the art, and those which are provided to enable practice of the present invention. Elements, which are known and existing in the art will be described as such while elements new to the art will be described within the scope of the present invention.

Figure 4:
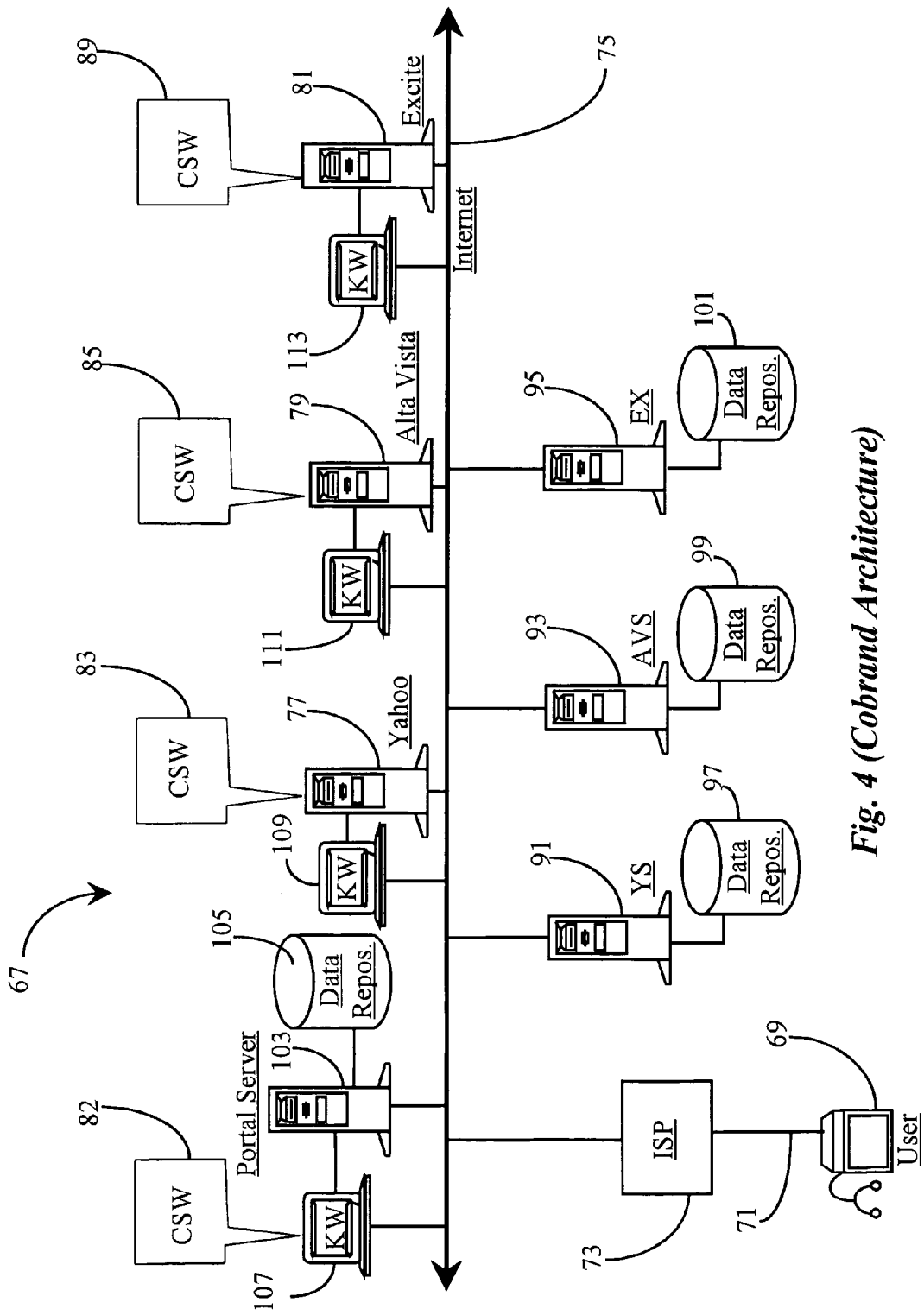
FIG. 4 is an overview of cobrand architecture according to an embodiment of the present invention.

FIG. 4 is an overview of cobrand architecture 67 according to an embodiment of the present invention. An Internet backbone of 75 is illustrated herein and represents all of the known lines, connection points, and equipment that make up the Internet network as a whole. Therefore, there is no geographic limit to the practice of the present invention. Connected to Internet backbone 75, are 4 exemplary servers. These are, a portal server 103, a portal server 77, a portal server 79, and a portal server 81. In this example, each portal server 103 through 81 is connected to backbone 75 by virtue of network connections as is known in the art.

Portal server 103 represents a server hosted by a main service provider seeking to cobrand services to business partners termed cobrand partners by the inventor. Server 77 represents a portal server hosted, in this example, by a company known as Yahoo™, which provides search and portal services to users. Server 79 and server 81 are hosted, in this example, by the well-known companies AltaVista™ and Excite™ respectively. Each of the three aforementioned companies specialize in providing search capabilities and limited portal services to registered users and/or subscribers. The companies hosting servers 77, 79, and 81 may be termed cobrand partners of a service-providing company hosting server 103.

Servers 77-81 may be adapted for other services and may be hosted by other companies than the services and companies mentioned in this example without departing from the spirit and scope of the present invention. The inventor chooses to illustrate server 77-81 as being hosted by the aforementioned companies simply because they are well-known and enjoy a large customer base. It may be assumed in this example, that each company hosting a portal server has at least one knowledge worker under employ as illustrated in this example by a knowledge worker 107 associated with portal server 103, a knowledge worker 109 associated with portal server 77, a knowledge worker 111 associated with portal server 79, and a knowledge worker 113 associated with portal server 81.

Knowledge workers 107-113 are endowed with various computer programming and engineering skills that are required for successful function of each hosting company. In actual practice, there would likely be many more knowledge workers under the employ of each company than are illustrated in this example. The inventor deems that the illustration of 4 such knowledge workers is adequate for the purpose of explanation of the present invention. In this example, knowledge workers 107-113 have connections to Internet backbone 75 and separate data connections to associated servers 103-81. It may be assumed that knowledge workers 107-113 are operating powerful personal computers as illustrated herein by computer icons.

Also illustrated as connected to Internet backbone 75, are servers 91, 93, and 95. Servers 91-95 represent Internet servers hosted by a company (service-providing company) also hosting server 103. Server 91, also labeled YS (Yahoo Server) is provided for cobrand subscribers visiting server 77. Similarly, server 93, also labeled AVS (Altavista server) is provided for a cobrand subscribers visiting server 79. The same is true for server 95, also labeled EX (Excite). Servers 103, 91, 93, and 95 have data repositories connected thereto and adapted for storing information about subscribers such as account information, profile information, user name and password information, and any other data about subscribers that may be deemed applicable for storage. For example, a data repository 105 is connected to portal server 103. Similarly, data repositories 97, 99, and 101 are connected to servers 91, 93, and 95 respectively. Data repositories 105-101 may, in one embodiment, be internal repositories instead of external repositories. Furthermore, servers 77, 79, and 81 may also be assumed to have data repositories connected thereto although none are shown.

A user 69, illustrated herein by an Internet appliance icon, connects to an Internet service provider (ISP) 73 by virtue of a telephone line 71. ISP 73 is adapted to provide standard dial-up Internet connections as is known in the art. ISP 73 is connected to Internet backbone 75 by virtue of an Internet-access line of 74. Telephone line 71 may be a normal connection-oriented-switched-telephony (COST) telephone line, or it may be a digital service line adapted for fast Internet connection such as a digital subscriber line (DSL), an integrated-services-digital-network (ISDN) line, or any other type of telephone line. User 69 may also access Internet 75 via a wireless connection without departing from the spirit and scope of the present invention. All that is required for user 69 to access Internet 75, is an Internet appliance capable, by virtue of software, for accessing the Internet and an appropriate connection means such as to ISP 73. It will be apparent to one with skill in the art that there are many alternative methods for connecting to an Internet network.

In this example, user 69 represents any number of users accessing the Internet for the purpose of interacting with Web services provided by the companies hosting servers 77, 79, 81, and in some embodiments, server 103. For purpose of discussion, it is assumed herein the user 69 is a regular patron of at least Yahoo™, Alatavista™, and Excite™. Furthermore, the skilled artisan will appreciate that there they may be many more services hosted by still more companies that are accessible to users through Internet 75 that are not represented in this example. It is restated herein, that the company hosting portal server 103 also maintains and hosts servers 91, 93, and 95, on behalf of companies hosting servers 77, 79, and 81, in the spirit of a unique cobrand relationship between the companies. It is to this aspect that the method and apparatus of the present invention relates.

A novel cobrand software application (CSW) 82 is illustrated herein as accessible to KW 107. CSW 82 is provided and adapted as a self-contained configuration application which enables a cobrand service to be created and implemented without requiring extensive software engineering, software installation, hardware reconfiguration, or other extensive effort normally required of a service-providing company engaged in implementing cobrand services through Web interfaces maintained by cobrand partners, represented in this example, by Yahoo™, Altavista™, and Excite™. CSW 82 is termed a cobrand control panel by the inventor, and may be referred to, hereinafter in this specification, as a cobrand control panel or simply control panel. It is noted herein, that instances of cobrand control panel (CSW) are illustrated as resident in servers 77, 79, and 81, and accessible to KWs 109,111, and 113 respectively. These instances of control panel are labeled with element numbers 83, 85, and 89. Control panel instances 83-89, running on servers 77-81 respectively, represent a received versions of cobrand control panel 82 distributed over Internet backbone 75 by a company hosting portal server 103 and providing cobrand services.

In practice of the present invention, the existence of cobrand control panel 82 in combination with cobrand architecture 67 provides a streamlined and efficient method for creating and implementing cobrand services on behalf of cobrand partners hosting servers 77-81.

Instead of attempting to install cobrand functionality to servers 77-81, the company providing cobrand services, which in this example, is a company hosting portal server 103 provides and maintains Web servers 91-95 has dedicated cobrand Websites for the companies hosting servers 77-81. Distributed instances of control panel 82 (83-89) are self-contained toolkits which may be manipulated by KWs 109-113 respectively for the purpose of selecting offered services and authoring HTML Web pages that will be installed in servers 91-95 respectively. Each cobrand partner controls the look and feel of authored cobrand Web pages such that individual users, represented herein by user 69, are unaware that the added functionality made available by the providing company is not generic to a cobrand partner's normal service.

A general process for implementing successful cobrand services on behalf of a cobrand partner maybe understood through discussion of the following example. KW 107 distributes generic control panel 82 over Internet backbone 75 to server 77 (Yahoo™) where it appears as distributed control panel 83. Control panel 83 contains complete description of all offered services and the appropriate Web-building tools for creating Web interfaces. An example of such a tool would be an HTML editor. KW 109 accesses control panel 83, selects services, and builds WEB pages giving access to the selected services. Control panel 83 allows KW 109 to import features generic to existing Yahoo™ interfaces for creating cobrand Web pages that mirror Yahoo's look and feel.

When KW 109 has completely configured control panel 83, it is submitted back to its source (portal server 103) and is again accessible to KW 107. KW 107 reviews and approves the completed control panel and installs the complete package into reserved server 91 and data repository 97. A hyperlink to server 91 is provided and embedded on such as a main page within server 77 along with an interactive registration form if applicable. In one embodiment, only a hyperlink is provided and server 77 and user registration takes place and server 91. A hyperlink provided within a portal page hosted on server 77 linking to a page hosted in server 91 may be a simple icon labeled my accounts, or some other applicable name.

After cobrand services are installed and active within server 91, user 69 may access server 77 during the course of normal Internet navigation and interaction. Upon noticing and invoking the provided linked to server 91, user 69 may be prompted to register for receiving added functionality, after which, he or she may ad Web accounts for servicing. In this example, the company hosting portal server 103 specializes and data gathering and aggregation through a single interface. However, this should not be construed as a limitation to practice of the present invention. A service providing company may offer a wide variety of disparate Internet services, and may cobrand such services using the method and architecture of the present invention.

Once user 69 is registered and authorized two use cobrand services setup and running in server 91, he or she may also register for and setup accounts for cobrand services offered through server 79 and 81. In this way, data gathering an aggregation services may be obtained for all of a user's Web accounts and/or services with through Web interfaces frequently visited by and known to user 69. In one embodiment, the service-providing company handles all registration requirements for new users. That is to say that once user 69 clicks on an appropriate hyperlink embedded in a main page posted in one of server 77-81, he or she will be immediately directed to the appropriate cobrand server 91-95 to begin registration. In this embodiment, every aspect of servicing users is performed by the service-providing company. The only requirement of a cobrand partner in this case is to maintain a link to an appropriate cobrand server. The exact implementation of individual responsibility with respect to registration and billing will depend on the nature of agreement between the participating companies. There are many possibilities. More detail about a cobrand control panel will be provided below.

Figure 5:
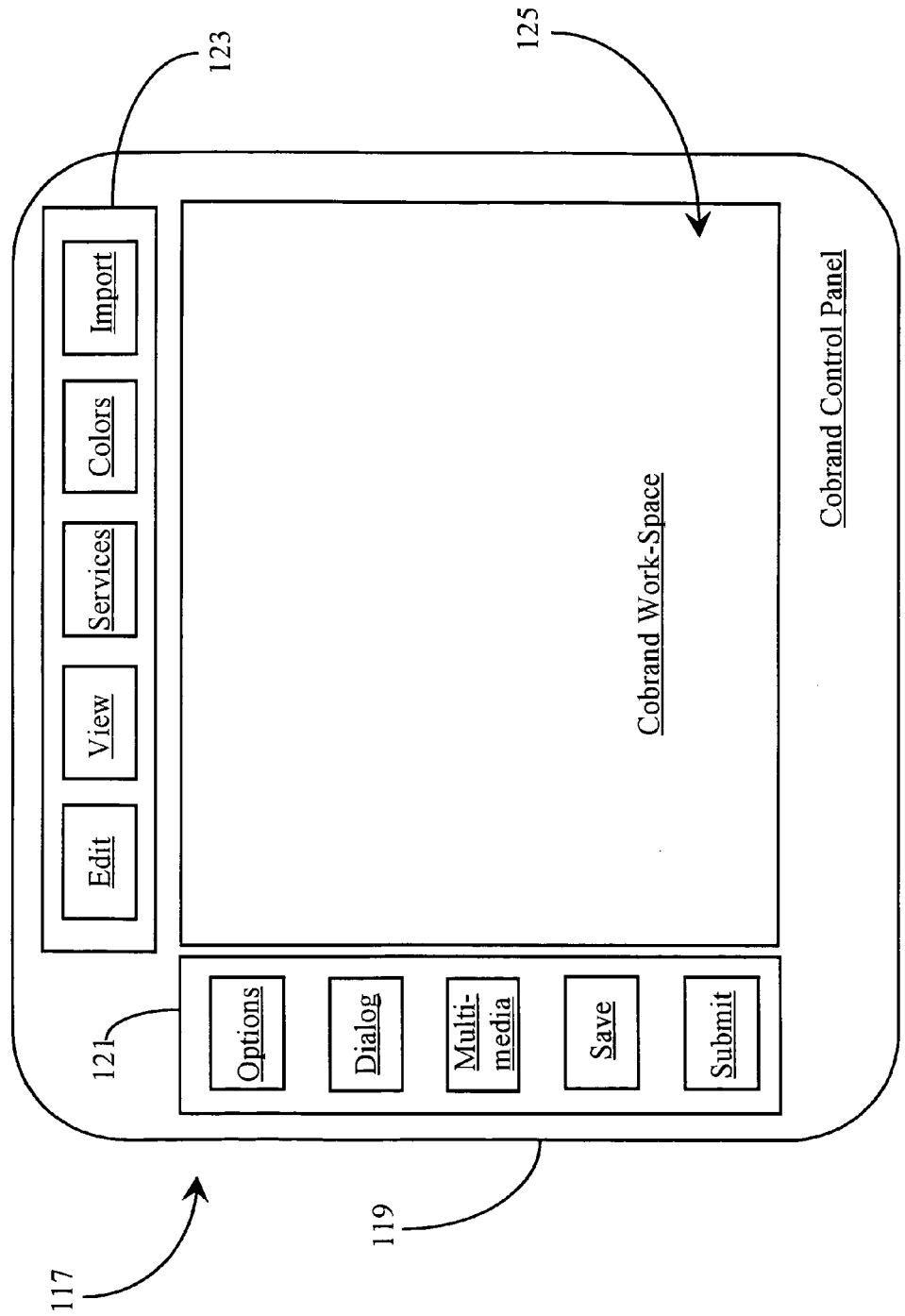
FIG. 5 is a plan view of a cobrand control panel according to an embodiment of the present invention.

FIG. 5 is a plan view of a cobrand control panel 117 according to an embodiment of the present invention. Cobrand control panel 117, in this example, is analogous to control panel 82 illustrated in FIG. 4 above. Control panel 117 is a self-contained toolkit as previously described with reference to control panel 82 of FIG. 4. In this example, a control-panel window is displayed on an appropriate PC monitor upon invocation of software 117, which may first appear as a control panel .exe icon. In this embodiment, control panel 117 represents an installable application, which would be installed as a permanent program on an appropriate computer connected to a receiving server, or on the receiving server accessible by a connected computer. In another embodiment, control panel 117 maybe provided installed in a separate server, which is accessed over the Internet by knowledge workers of cobrand prospects. There are many possibilities.

Control-panel window 119 comprises, in this example, a tool bar 121, a tool bar 123, and a cobrand workspace 125. Tool bar bars 121 and Fey 123 are provided and adapted with controls, which may be invoked by a knowledge worker configuring a cobrand service-package. In place of active tool bars, a drop-down menu or menus may be provided without departing from the spirit and scope of the present invention. There are many possible implementations. For example, tool bar 123 contains an edit, function labeled as such, that is provided for enabling editing of completed portions of control panel 117. A view function, labeled as such, is provided within tool bar 123 and adapted for enabling viewing of various portions or steps of cobrand configuration process. A services function, labeled as such, enables a knowledge worker to browse and select offered services for implementation. A colors function, labeled as such, is provided within tool bar 123, and enables a knowledge worker to implement color schemes and so on to works in progress. In import function, labeled as such, is provided within tool bar 123, and is adapted to enable a knowledge worker to import features and functionality generic to the particular cobrand partner. Proprietary logos, copyrighted material, images, proprietary search interfaces, and so on are examples of imported features.

Tool bar 121 contains additional exemplary functions, which will be described individually as follows. An options function is provided within tool bar 121 and adapted to enable a knowledge worker to browse various options available in configuring cobrand package. In a dialog function, labeled as such, is provided within tool bar 121 and adapted to enable a knowledge worker to create interactive dialog functions and embed them into cobrand Web pages. A multimedia function, labeled as such, in spite of within tool bar 121 and adapted to enable a knowledge worker to create and embed multimedia functionality into cobrand Web pages. A save function, labeled as such, is provided within tool bar 121 and adapted to enable a knowledge worker to save completed works. A submitted function, labeled as such, is provided within two or 121 and adapted to enable a knowledge worker to submit a completed cobrand package to a service-providing company. A cobrand workspace 125 is provided within cobrand window 119 and adapted as a workspace for generating HTML pages, testing various functions, and so on.

The inventor intends that control panel 117, as described in this example, represent just one possibility among many alternative possibilities for implementing an interactive and self-contained control panel for configuring cobrand services. Furthermore, the functions represented within tool bars 121 and 123 are intended to be exemplary only of types of functions that may be provided within control panel 117. One with skill in the art will appreciate that there may be many alternative presentations. Control panel 117 contains all of the functions required in order to successfully create, configure, and implement a cobrand-service.

Figure 6:
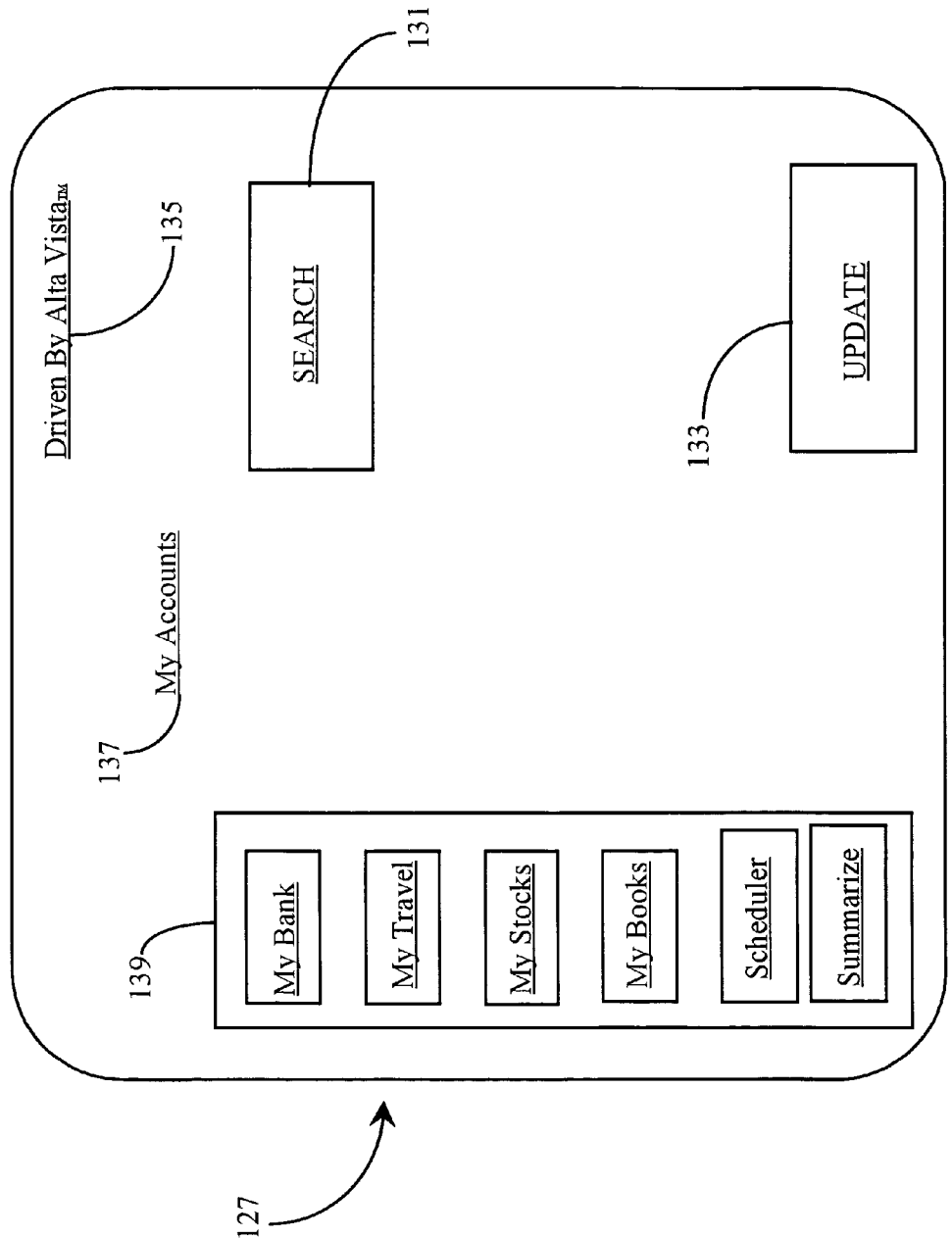
FIG. 6 is a plan view of a cobrand user interface according to an embodiment of the present invention.

FIG. 6 is a plan view of a cobrand user interface 127 according to an embodiment of the present invention. Cobrand-user interface 127 is, in preferred embodiments, an interactive web page created from within control panel 117 of FIG. 5, and hosted on one of cobrand servers 91-95 of FIG. 4. Interface 127 may be assumed to be a main cobrand web page as seen by a user interacting with cobranded services. In a case wherein a service-providing company is a data aggregation service, then interface 127 may represent a starting page or a portal page from whence numerous accounts may be aggregated and summarized for data. A title for interface 127 may be as simple as a title illustrated herein as My Accounts and labeled with element number 137. In the particular example, a text notation labeled Driven by AltaVista™ and represented by element number 135, identifies the particular cobrand partner. As previously described, interface 127 may have although look and feel of a main public interface hosted by AltaVista™ such that a user is not aware of the involvement of a service-providing company and providing value-added services.

A search interface 131 is provided an embedded within interface 127 and is adapted to enable a user to perform a keyword search. Interface 131, may be a version of the interface that is available on a cobrand partner's main web page. Preferably, the look and function of interface 131 is identical to a standard search function provided by a cobrand partner made available to it's standard user fair. A tool bar 139 is provided an embedded within interface 127. Tool bar 139 contains interactive selections of the user accounts added to page 127, presumably after a user has completed registration. Listed accounts are, from top to bottom, My Bank, My Travel, My Stocks, and My books. These exemplary accounts are intended to represent just some of possible accounts that may be configured to cobrand services by a user. Tool bar 139 also contains a scheduler function and a summarize function. An update function 133 is provided within interface 127 and adapted to enable a user to obtain periodic updates concerning accounts list 139 up to left.

It will be apparent to one with skill in the art that there may be many more functions provided an embedded in web page interface 127 that are illustrated in this example without departing from the spirit and scope of the present invention. The inventor intends that the functional elements represented herein are only exemplary of many such possible functions and interfaces that may be embedded into Web page 127.

In this particular example, a user accessing cobrand web page 127 may retrieve data summaries from the configured accounts illustrated in tool bar 139 by selecting each account and then selecting summarize using a summarize function, labeled as such, and provided within tool bar 139. In one embodiment, data may be retrieved from all of the listed accounts and summarized. A scheduling function, labeled as such, is provided within tool bar 139 allows a user to specify the time or time period for obtaining data, performing summaries, and so on. An update function 133 is available within interface 127 and adapted to allow a user to simply update any of the accounts listed in tool bar 139.

It will be apparent to one with skill in the art, that interface 127 may contain functionality and user-operated controls that are different than what is represented herein without departing from the spirit and scope of the present invention. The exact functionality built into interface 127 will depend on the services provided by the service providing company and the extent that such services are harnessed by cobrand partners.

It will also be apparent to one with skill in the art, that by providing a self-contained cobrand control panel 117 to be utilized in conjunction with cobrand architecture illustrated more particularly with servers 91, 93, and 95, of FIG. 4, much of the time and resource associated with prior-art cobranding techniques and architecture may be eliminated.

Ad-Broker Architecture

As described in the background section, prior-art advertising wherein ad servers are used to deliver banner ads over a data-packet-network (DPN) into common user interfaces is rather limited in efficiency by virtue of the fact that the various ad servers delivering ads do not associate similar ads with similar key words. As a result, disparate ads are routinely delivered to a same user that uses multiple interfaces. The inventor provides a method and apparatus that acts to normalize advertisements sent by disparate advertisement companies such that similar ads are delivered to multiple interfaces frequented by a same user.

Figure 7:
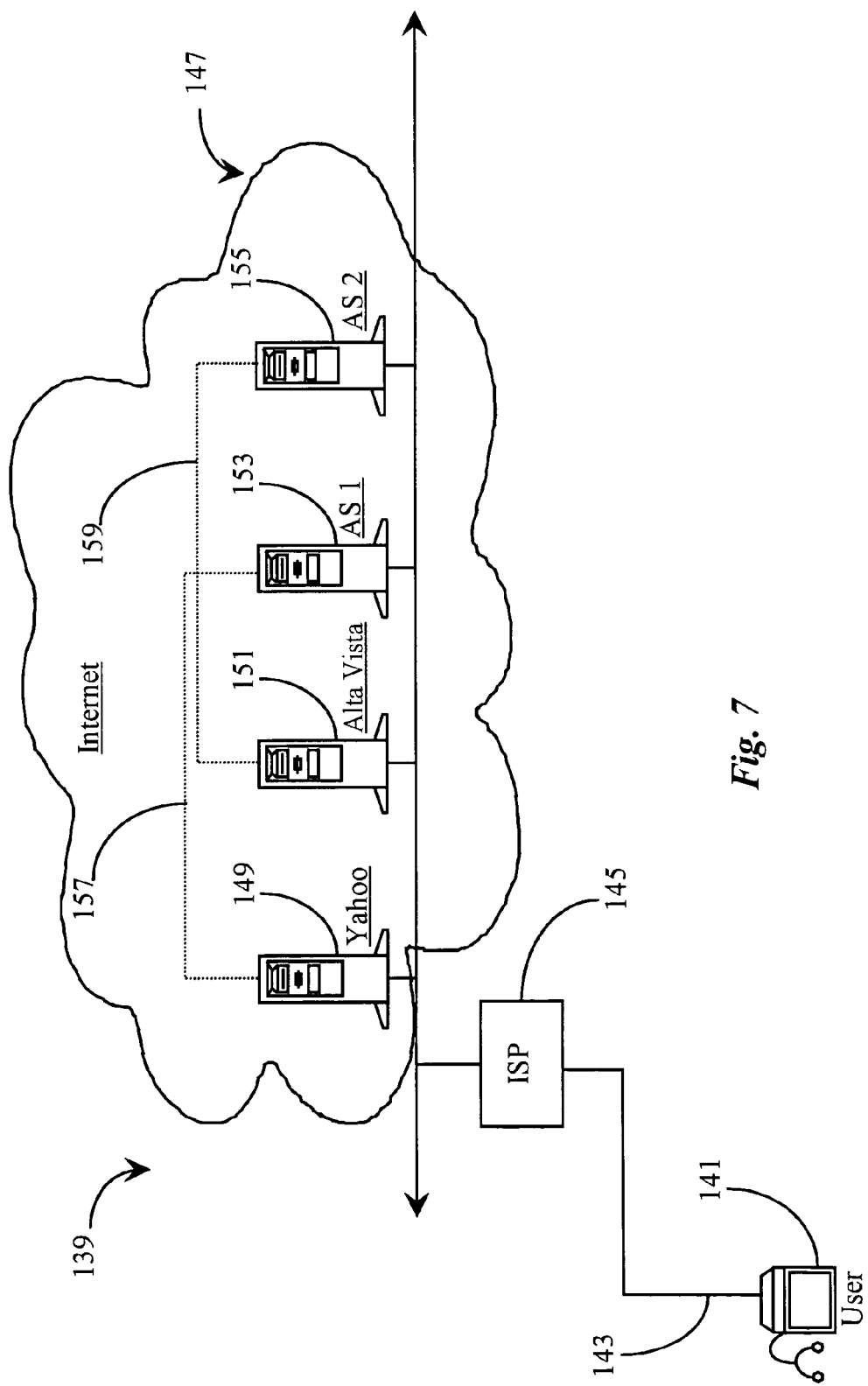
FIG. 7 is an overview of a communication network wherein banner advertising is practiced according to prior art.

FIG. 7 is an overview of a communication network 139 wherein banner advertising is practiced according to prior-art. Network 139 utilizes an Internet network represented herein by element number 147 as a medium of communication. Internet 147 is chosen as a preferred communications medium in this prior-art illustration because of it's high public access characteristic.

A user 141 is illustrated, in this prior art example, as connected to an Internet Service Provider (ISP) 145 using an Internet capable appliance such as a personal computer running Internet capable software. Access to ISP 145 may be accomplished through a connection-oriented telephone network such as the well-known public-switch telephony network (PSTN) as is known in the art. An Internet access line 143 represents such as a cable-modem connection, a typical dial-up connection, an ISDN connection, a wireless digital connection, and so on. In this prior art example, ISP 145 is implemented as a dedicated provider using an Internet connection server (not shown) for providing Internet access. The arrangement illustrated herein for enabling user 141 to access Internet 147 is generally known in the art.

ISP 145 is connected to Internet 147 by virtue of an Internet access line as illustrated. Other equipment known in the art to be present and connected to a network such as Internet 147, for example, TP data routers, data switches, gateway routers, and the like, are not illustrated in this prior art example, but may be assumed to be present.

Four Internet file servers 149, 151, 153 and 155, are illustrated as connected to Internet 147, which is also represented by a double arrow intended to illustrate an Internet backbone. In this prior-art example, server 149 represents a portal server hosted by Yahoo™, which is a well-known company providing on-line search services. Server 151 represents yet another portal server hosted, in this example, by Alta Vista™, which is another well-known data-search provider.

Yahoo™ and Alta Vista™ are examples of well-known companies that provide, Internet portal services including user WEB-directories and/or search engine interfaces for performing data searches on the Internet. Other similar services known in the art are hosted by such companies as Hotbot™, Dog Pile™, Info-Search™, and so on. Functionality provided by servers 149 and 151 is typically dependent on the exact nature of services offered by the hosting companies. Generally speaking, however, it may be assumed that user 141 may access Internet 147 and perform, at least, a data-search operation from either server 149 or server 151.

Servers 153 and 155 are intended to represent advertising servers and are labeled AS1 and AS2, herein. As is well known in the art, banner advertisements are advertisements that are sent to Internet users. These ads are, in one aspect, generated based on keywords or search phrases that a user exerts at a search engine prompt. In another aspect, banner ads are associated with embedded keywords or phrases associated with a user's interface. Each banner advertising company uses a unique keyword selection to generate a certain banner ad. For example, if a user exerted the keyword travel while searching from server 149 hosted by Yahoo™, a banner ad may be sent from ad server 153 (AS1) soliciting a trip to Hawaii. If a same user exerted the same keyword travel while searching from server 151 hosted by Alta Vista™, a banner ad may be sent from ad server 155 (AS 2), soliciting a trip to Florida. Dotted-line connectors 157 and 159 are used to draw an association between Yahoo server 149 and ad server 153, and between Alta Vista™ server 151 and ad server 155. This association is a business one and is typical in prior art practice. That is to say, that one advertising company will generally service one portal company. Therefore, ad servers 153 and 155 will use different key-word associations, which trigger differing advertisements. It may be assumed in this example, that servers 153 and 155 are hosted by disparate advertising companies in competition with each other.

According to prior-art practice, user 141 connects to Internet 147 via connection 143 and ISP 145. User 141 may elect to perform a search at Yahoo™ server 149 or at Alta Vista™ server 151. Although not shown herein, user 141 exerts a keyword or search phrase during a data-search session as is known in the art. Based on the entered keywords or phrases, various URLs are retrieved from each search-engine's or directory's data-base and the results are then displayed at the user interface.

As keywords or phrases are entered, such keywords or phrases may be used to cause banner ads from either server 153 or 155 (depending on which portal server is in use) to be delivered into the appropriate and associated user interface.

As described above, servers 153 and 155 are hosted by disparate advertising companies who create and provide banner ads to user interfaces at servers 149 and 151 respectively. Examples of advertisement companies engaged in banner advertising on Internet 147 would include such known companies as Double Click™ and Net Gravity™. The aforementioned advertising companies present their banner ads on behalf of the advertised company in exchange for a commission. For Example, Double Click™ may have an agreement with an airline company, such as American Airlines™. The agreement may be such that if a user is searching for airline tickets to Hawaii at server 151 (Alta Vista™), for example, and exerts a keyword phrase tickets to Hawaii, an American Airlines™ ad might be sent by virtue of the ad server 155, to the associated user interface. If, for example, user 141 responds to this ad by either clicking on the banner ad or elects to make a purchase of tickets from American Airlines™, it is assumed that a revenue of that click-through or sale would be paid to Double Click™ and perhaps a portion thereof to Alta Vista™. This business practice is well-known in the art.

In this prior-art example, banner ads are sent to a user based solely on exerted keywords or phrases exerted during a data-search and are rather impersonal. Furthermore, because servers 153 and 155 are not affiliated, there is no standardization of keywords to types of banner ads. As a result, there is a limited success or hit rate (user click) connected to delivered banner ads. Furthermore, a same user may get widely differing ads from portal to portal even though a same keyword or phrase is used in search engines. Similarly, active, in-depth, profiling of users is not typically performed by most service providers. Therefore, an ad agency does not have the ability to decide whether to send, for example, an ad from a real estate company that has featured homes in a $100,000 bracket or from a company that has featured homes in the $750,000 bracket. It would be ineffective to send an ad for a higher priced home to a moderate wage earner. The inventor provides a unique solution to the above-described limitations. Such a solution is described in detail below.

Figure 8:
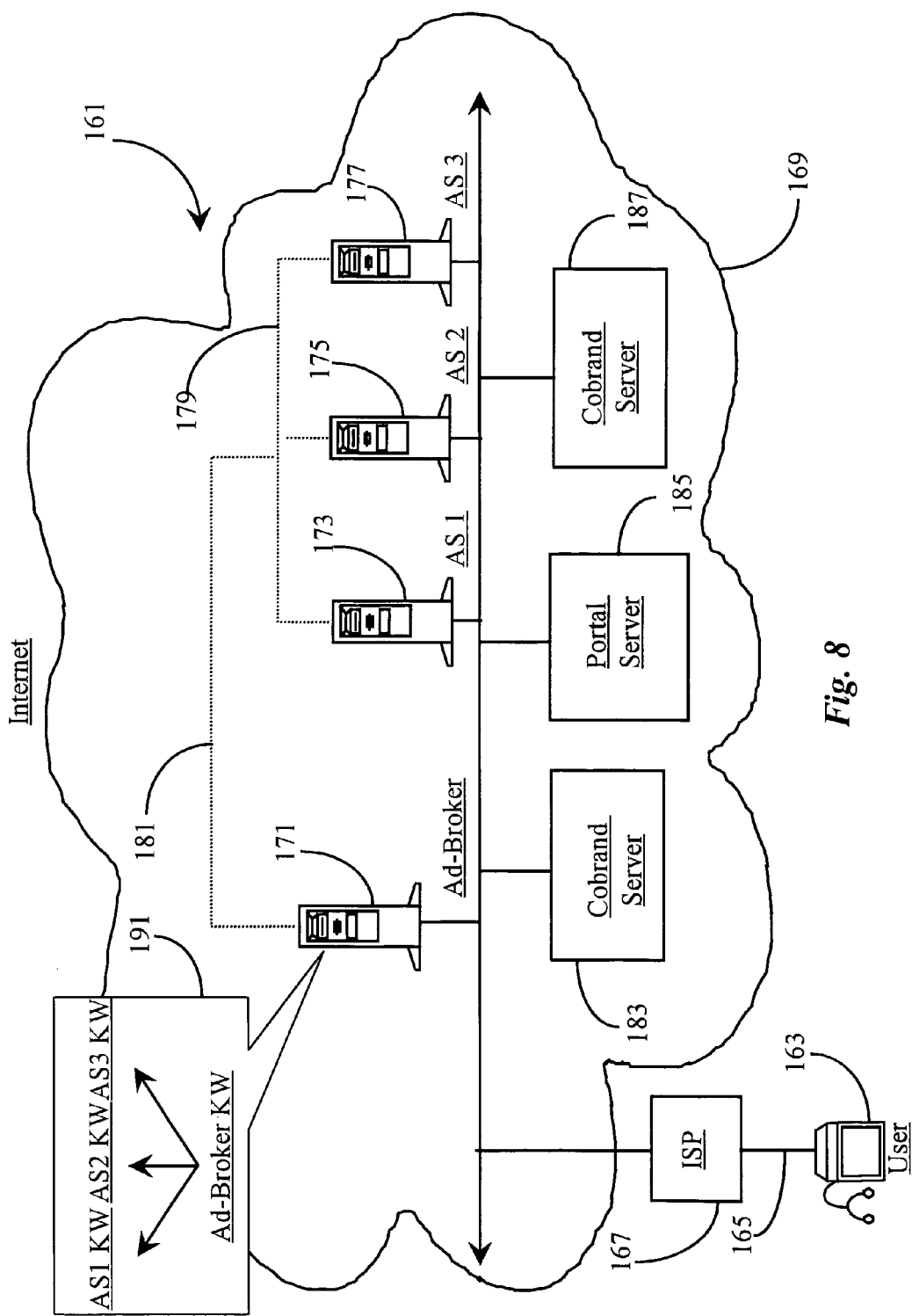
FIG. 8 is an overview of a communications network wherein banner advertising is practiced according to the present invention.

FIG. 8 is an overview of a communications network 161 wherein banner advertising is practiced according to an embodiment of the present invention. In this example of the present invention, the well-known Internet network, represented herein with element number 169 is chosen by the inventor as a preferred medium of communication for the same reasoning described in FIG. 7. However, this should not be considered limiting, as the invention could apply in other networks and combinations of networks.

In this embodiment, a user represented herein by element number 163 (Internet-appliance icon) is illustrated as connected to an ISP 167 by virtue of an Internet connection line 165. In turn, ISP 167 is connected to Internet network 169 via an Internet access line as is known in the art. User 163, line 165, and ISP 167, may be assumed to be analogous to user 141, line 143, and ISP 145, as described in FIG. 7. Also as described in FIG. 7, additional equipment known in the art to be present and connected to an Internet network such as Internet Network 169 may be assumed to exist in this example. Examples of such equipment include, but are not limited to, IP data routers, data switches, gateway routers, and the like. It may also be assumed in this example, that Internet connection is achieved through a connection-oriented network such as the well-known PSTN.

A double-arrowed line illustrated with an Internet network 169 represents an Internet backbone and may be assumed to contain all of the lines, connection points, and equipment known to make up the Internet network as a whole. Therefore, there's no geographic limit to the practice of the present invention.

In this example, three advertisement servers are illustrated as connected to the backbone of network 169. These are, ad server 173 (AS 1), ad server 175 (AS 2), and ad server 177 (AS 3). As described above, ad servers are hosted by advertising companies that send banner ads to a user interface based on search functions, and in some cases content keywords contained in within a user interface.

In a preferred embodiment of the present invention, a unique server labeled herein with element number 171 is provided within network 169 and adapted as a broker-server that communicates with each of servers 173-177. Server 171 is termed an ad-broker by the inventor. According to a unique method, ad-broker of 171 is dedicated to brokering the activities of servers 173-177 such that a standardization is created with respect to ad similarity in association with similar keyword attributes. Negotiation between ad broker 171 and servers 173-177 is illustrated herein by a dotted connector-tree 181.

A unique broker-software application 191 is provided and adapted to associate a specific set of keywords or phrases to individual ones of the banner-ads stored and servers 173-177. Application 191 is manipulated, in a preferred embodiment, by an ad-broker knowledge worker or administrator (not shown), the presence of which, may be assumed in this example. In actual practice, an ad-broker administrator would command a computerized workstation connected to the backbone of network 169, and would have access to server 171 and subsequently, servers 173-177. More about the function of application 191 will be provided below.

The example illustrated herein represents an embodiment wherein cobrand services are utilized as described with respect to FIGS. 4-6 above. In this regard, 2 cobrand servers are provided and illustrated herein as connected to the Internet backbone of Internet network 169. These are, cobrand server 183 and cobrand server 187. Servers 183 and 185 may be assumed to be analogous to servers 91-95 of FIG. 4 above. Also illustrated, is a portal server 185, which may be assumed to be analogous to portal server 103 of FIG. 4.

It was described further above, that cobranded services provide added functionality for subscribers to cobrand partners by redirecting them from partner-maintained servers to a user interfaces maintained in a server hosted by the service-providing company. In this way, users enjoy the benefit of existing services with added capability of managing multiple accounts from a single interface (data aggregation). It is desired by the inventor in this case that the banner ads streaming into these cobrand interfaces are somewhat normalized and personalized for users operating from within those interfaces. More particularly, it is desired that when a single user has multiple cobrand interfaces, that banner ads delivered thereto from disparate and companies are at least similar if not reflecting somewhat the status of the user as determined through profiling, and perhaps keywords or phrases derived from user content included within an interface.

Referring now back to FIG. 8, servers 183 and 187 are cobrand servers maintained in this example, by a company hosting portal server 185. Servers 149 and 151 of FIG. 7 are not illustrated in this embodiment, but may be assumed to be present. For example, server 183 might be a cobrand server setup for Yahoo™. Server 187 might be a cobrand server setup for Alta Vista™. There are many possibilities.

It may be assumed in this example, that user 163 has registered for a user interface in servers 183, 185, and 187. It may also be assumed in this embodiment, that one of servers 173-177 serves banner ads to one of servers 183-187 through an extension of normal contractual arrangement pre-existing between the advertisement companies and the cobrand partner companies previously described. Because servers 173-177 are not affiliated with one another and do not return similar ads based on similar keywords or phrases, it is the job of ad broker 171 to insure that similar keywords or phrases exerted from, or in some embodiments, embedded into user interfaces invoke the presence of similar advertisements sourced from disparate ad servers 173-177.

In order to accomplish the above-described goal, the company hosting ad broker 171, which in this case, is the same company hosting portal server 185, must work closely with each of the companies hosting servers 173-177. For example, all of the keywords and associated banner-ad descriptions must be obtained from server 173. The just-described process must be repeated for servers 175 and 177 respectively. This process is illustrated logically within application 191 by an arrow tree associating ad-broker keywords to disparate sets of ad-server keywords.

In one embodiment, a set of generalized keywords generic to ad-broker 171 is mapped to existing keywords used at each of ad servers 173-177. In this embodiment, each ad description is reviewed in order to determine if the particular ad it is appropriate for a particular ad-broker-generated keyword. In this case, a broker keyword travel may be mapped to existing keyword vacation with respect to ad server 173, resort with respect to ad server 175, and lodge with respect to ad server 177. In each case, the actual advertisements equated to each existing keyword with respect to ad servers 173-177 would be carefully reviewed to insure that they are appropriate and similar in scope with respect to each other.

In another embodiment, ad broker keywords are used in-place of existing ad server keywords at the location of each ad server hundred 173-177. In this case, each ad server 173-177 would utilize two sets of keywords. One for delivering ads to normal interfaces and one for delivering ads to cobranded interfaces. Standard Internet address recognition may be used to determine whether an ad is destined for a normal interface or a cobranded interface.

Information about users subscribing to cobranded interfaces may be solicited for the purpose of assisting ad broker 171 in creating a flexible set of keywords that function to return ads from servers 173-177 that are not just normalized, but also somewhat personalized to the status of a user. For example, an annual income reported by a user may be used to enhance ads streamed to that user. For example, a keyword travel may be created by administrator working with application 191 such that the keyword has three states. Each state of the keyword may reflect a certain income range of a user. If a user's annual income is over $150,000 annually, then the keyword travel a may be employed. Users earning between $80,000 and $150,000 annually may be assigned travel b. Users earning between 0 and $80,000 annually may be assigned travel c. Banner ads stored within servers 173-177 may be carefully selected and associated with various states of keywords or phrases. It is noted herein, that the analytical process that must be performed for reviewing banner ads and mapping broker keywords to existing ad keywords, or replacing ad keywords with broker keywords is performed by an administrator or knowledge worker as previously described.

However, and one embodiment this determination process may be performed electronically using knowledge-base technology.

In one embodiment, keywords may be parsed from user interfaces and complied electronically. For example, instead of a knowledge worker making a logical determination pertaining to which keywords will be broker keywords, keywords may be randomly parsed from the HTML or other language contained within banner ads themselves. A banner ad may have the keywords, "cross-stitching", "knitting" and "women" contained therein. Banner ads of this nature, would only be sent to a user interface wherein profile information indicates that the particular user enjoys crafts and is of the female gender. In this case, a keyword set parsed from a particular banner ad is matched with the particular keyword set describing a user. Electronic matching of keywords sets may be accomplished from within ad broker 171 by virtue of broker application 191.

In an alternative embodiment of the present invention, user 163 may be a subscriber at portal server 185, which in this embodiment is not a cobrand server, but the portal server maintained by the same company hosting ad broker 171. It might be, that ad server 175 serves ads to portal server 185. In this case, ad broker 171 brokers ads for server 185 as well as servers 183 and 187, which cobrand servers.

In one embodiment of the present invention, a user subscribing to a portal service providing cobranded services may also utilize other portal services as described above. Through benefit of having an extensive profile knowledge of a particular user, the service-hosting company may work with advertising companies to extend ad normalization and customization to such users when they are utilizing normal portal interfaces such as Altavista™ or Yahoo™. Advertisements may be personalized to the extent of knowledge about a particular user by tracing the user's identity when he visits a non-cobranded interface. This can be accomplished through cookie exchange. In this way personalized ads may be caused to follow the user at other popular interfaces.

Site Tracker Architecture

Figure 9:
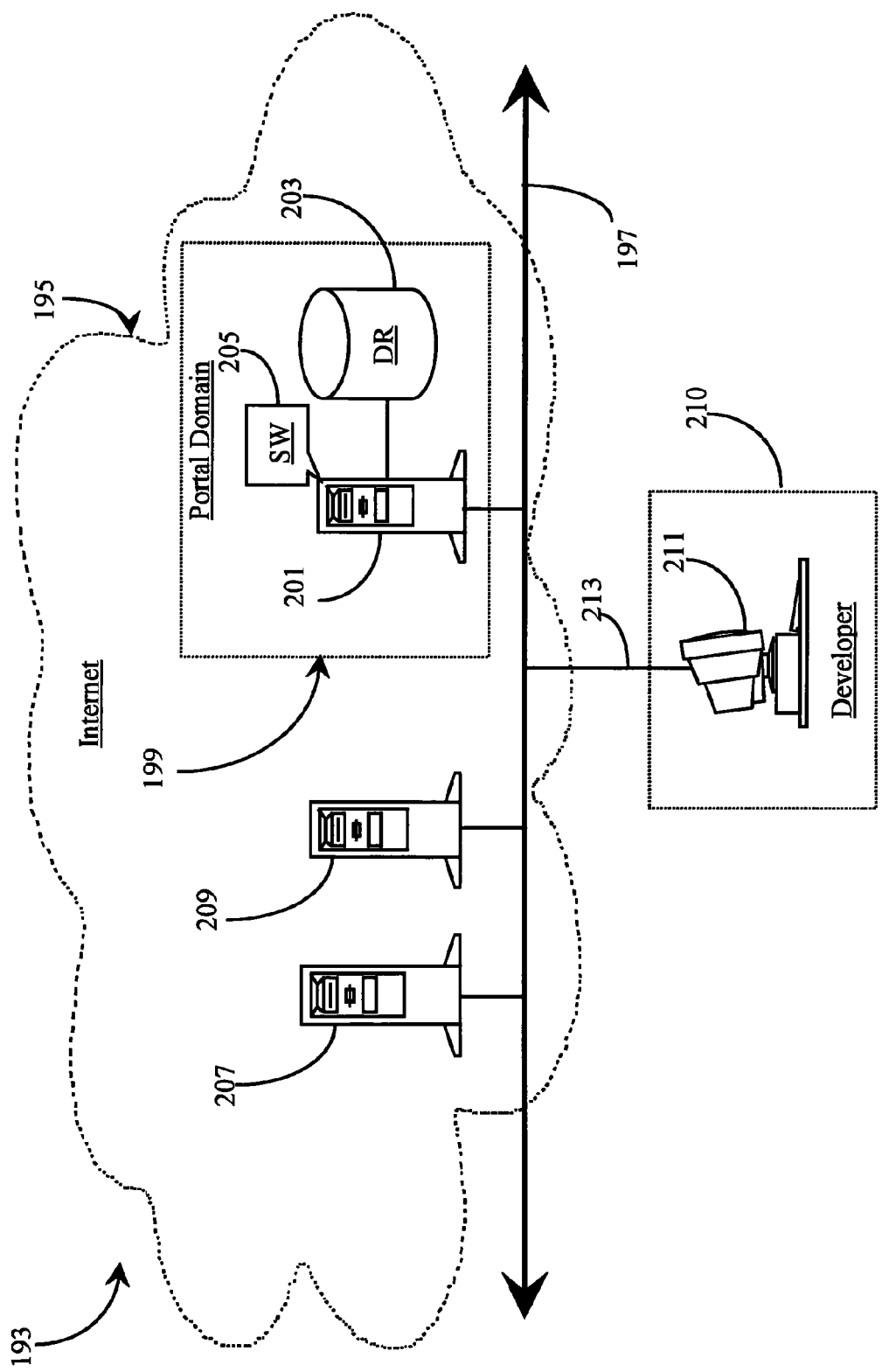
FIG. 9 is an overview of a network architecture wherein Web-site tracking is practiced according to an embodiment of the present invention.

FIG. 9 is an overview of a network-architecture 193 wherein Web-site tracking is practiced according to an embodiment of the present invention. Architecture 193 comprises a data-packet-network (DPN) 195, which in this example is the well-known Internet, a portal service domain 199, and an exemplary Web-developer 210. In this example, Internet 195 is chosen by the inventor as a preferred medium of communication because of it's high public-access characteristic. However, this should not be considered limiting, as the invention could apply in other networks and combinations of networks. Examples include, a corporate intranet, a private wide-area-network (WAN), and so on.

An Internet backbone 197 is provided within Internet network 193 and represents all of the lines, connection points, and equipment that make of the Internet network is a whole. Therefore, there is no geographic limitation to practice the present invention. A Web server 207 is illustrated within Internet 193 and connected to backbone 197. Web server 207 is adapted as an Internet server containing information pages known as Web pages in the art. Such information pages are typically hyper-text-markup-language (HTML)-scripted electronic pages that provide certain interactive services to users who patronize them. Another Web server 209 is illustrated within Internet 193 and connected to backbone 197. Web server 209 is adapted identically as Web server 207 described above. Servers 207 and 209 may in one embodiment, be shared by a plurality of companies providing Web-based services.

In this example it is assumed that individual Web pages contained in server 207 and 209 may be hosted by a variety of different service providers. In another embodiment, server 207 may be hosted by a single entity wherein all of the web pages contained therein belong to that entity. The same may be said of server 209, or a single host may own and control both sites. It is noted herein that there may be many more Web servers provided and connected to backbone 197 than are illustrated in this example. However, the inventors illustrates two such servers and deem such illustrations adequate for the purpose of explanation of the present invention.

A portal-service domain 199 is illustrated within Internet 193. Portal domain 199, enclosed within a dotted rectangle, represents a company providing Internet portal services to a plurality of subscribing users as is taught in application Ser. No. 09/208,740 listed in the cross-reference section above. Portal domain 199 may be assumed to include all of the required equipment and connections necessary for providing Web-portal services including proxy navigation and data-gathering services.

A Web server 201 is provided within portal domain 199 and illustrated as connected to backbone 197. Server 201 is adapted as a Website tracking server, which is enabled by virtue of a novel software instance (SW) 205. SW 205 is provided and adapted to enable server 201 to track various states, conditions and activity related to any electronic information pages (Websites) held in either of servers 207 or 209, which represent all servers connected to the Internet. A data repository (DR) 203 is provided within domain 199 and illustrated as connected to server 201 by virtue of a high-speed data link. Data repository 203 is adapted to store data pertaining to states, conditions, activities and any other relevant data about electronic information pages stored in servers 207 and 209, which are subject to monitoring by server 201. Data repository 203 may be an external data repository as is illustrated herein, or may be an internal repository to server 201.

In this example, portal domain 199 seeks to provide and maintain functional access by proxy on behalf of its subscribers to specific Websites described above as being contained in servers 207 and 209. Functional access, as used in this specification, is defined as an ability to fully interact with Web pages hosted in servers 207 and 209 in fully automated fashion on behalf of subscribers without requiring any input from individual subscribers other than a simple request. Full interaction may include but is not limited to navigation, form filling, automatic login, automatic registration, data gathering, data summarizing, and automated purchasing. SW 205 functions to aid in realizing this goal, according to embodiments of the present invention, by providing an automated data pool, which is accessible through accessing repository 203. The data pool contains all of the current data that may be relevant to any monitored Websites in organized and readily useable format.

Web-developer 210 operates a personal computer (PC) 211 connected to backbone 197 by virtue of an Internet connection path 213 in order to access servers 207, 209 and 201. In this example, developer 210 is operating from a remote location outside of portal domain 199. However, in another embodiment, developer 210 may be stationed within domain 199 and be connected to server 201 via a LAN connection. In this case, connection to backbone 197 may also be part of LAN capability. It is a responsibility of Web developer 210 to create functional software routines for enabling automated access to functional services offered through interactive information pages contained in servers 207 and 209. It is also the responsibility of developer 210 to maintain functional access to such services over time by adapting to any changes in states or conditions that occur for any of the target Websites.

In practice a plurality of developers, each operating connected workstations, are employed for creating and maintaining functional access to Web site services selected for automation. The inventor illustrates a single developer and deems the illustration sufficient for describing the present invention. Moreover, there may be many more servers hosting Websites connected to backbone 197 that are subject to monitoring than are illustrated herein. The inventor illustrates 2 servers, servers 207 and 209, for illustrative purpose only.

SW 205 empowers server 201 to monitor and obtain any relevant data from any activity specific to monitored Websites available through servers 207 and 209. The data obtained in this fashion is stored in database 203 and is accessible to developer 210 as previously described. In a preferred embodiment developer 210 accesses site-tracking software 205 through a Web browser installed on PC 211. Developer 210 mines data from repository 203 for the purpose of facilitating performance of his or her responsibility, which is to create and maintain automated access to Web site services on behalf of subscribers and to maintain functionality of Websites in this regard over time. More detail regarding the function of and interaction with SW 205 is provided below.

Figure 10:
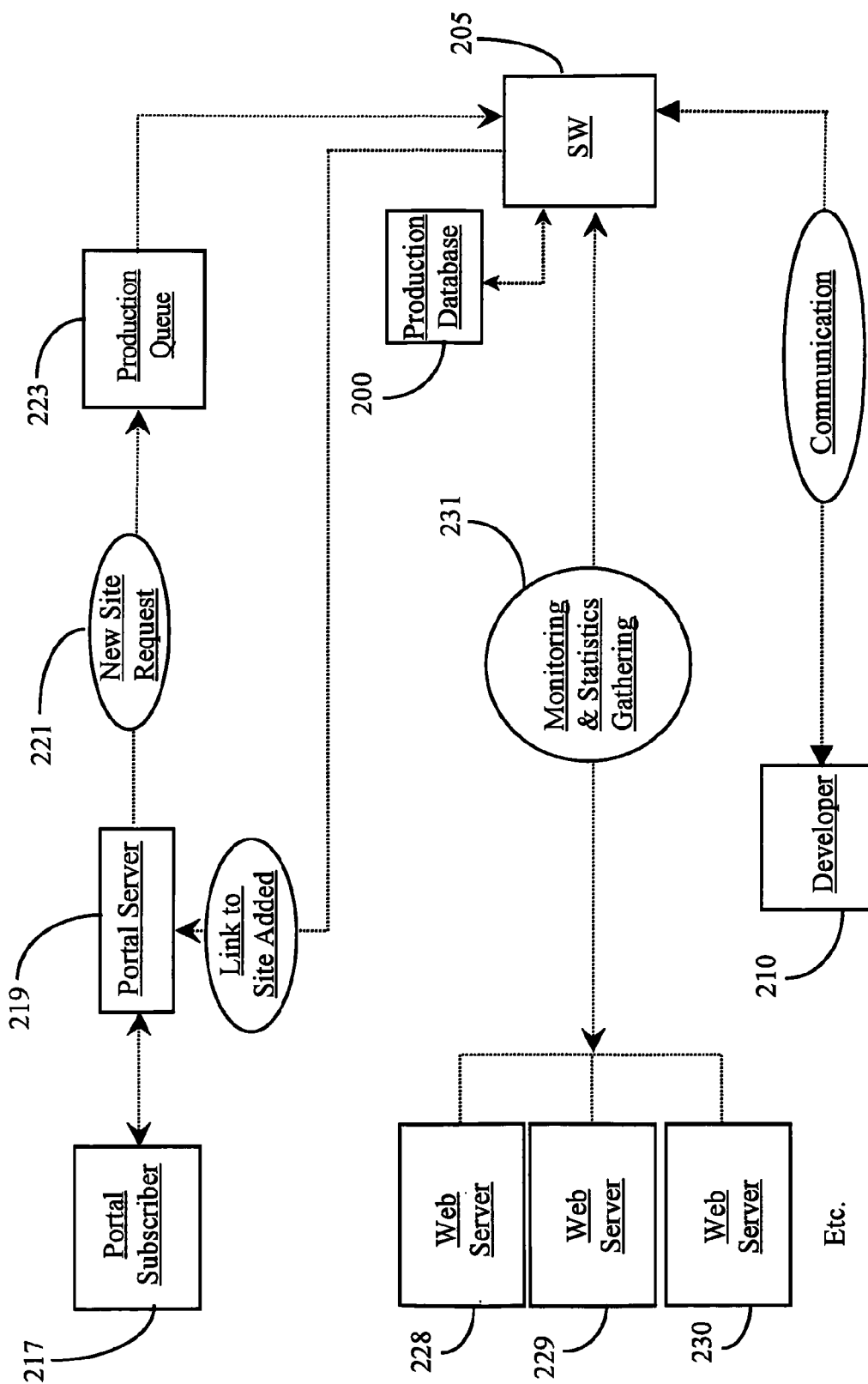
FIG. 10 is a block diagram illustrating various communication pathways and functionalities of a site-tracking interaction process according to an embodiment of the present invention.

FIG. 10 is a block diagram illustrating various communication pathways and functionalities of a site-tracking interaction process according to an embodiment of the present invention. This block diagram, according to an embodiment of the present invention, is intended to illustrate exemplary communication pathways and automated software processes that may be initiated and invoked during interaction between developers and site tracking software 205.

The process for selecting sites for Web automation on behalf of portal subscribers may be aided in a number of ways. It is preferred that sites selected for automation be popular sites with many end-users. Therefore, a site may not be selected for automation unless a large number of end-users have repeatedly requested the site or, it is generally known in Internet community that the site in question enjoys a wide popularity. Automated sites may, in some embodiments, be presented to users in the form of a list of sites made available through a portal server 219. A user clicking on an icon asserting an address for such an automated site may, if desired, be automatically registered to or subscribed to the site and its services. Moreover, any services offered by a site may be accessed and manipulated on behalf of a requesting user without the user being required to visit the site.

In one embodiment, site selection for automation may be reserved for a specific group of high-level employees such as, perhaps, a marketing group. The decision to add a site may be based on a certain period of prior research into the site and its services. Furthermore, negotiation with companies hosting selected sites may, in some respects, have to be completed before a site may be added.

A new site request, illustrated herein as site request 221 enters a production queue 223 after it is confirmed that the site will be added. Production queue 223 may be a part of the function of server 201 of FIG. 9. Queue 223 contains all of the required parameters associated with all of the approved site requests. Such parameters are organized in the form of job orders in one embodiment, which are then sent to software 205. Software 205 accepts a job order for a new site addition and begins monitoring the specific web site for the purpose of gaining information that will aid in developing the automated routines used to enable access to the site by proxy. This function is illustrated herein by a monitoring and statistics gathering function 231 accompanied by a bi-directional communication arrow between software 205 in a plurality of Web servers 228, 229, and 230.

Web servers 228, 229, and 230 are analogous to Web servers 207 and 209 of FIG. 9. In this example, Web servers 228-230 are Web servers hosting Websites selected for automation. A production database 200 is provided for keeping track of production status related to the process of automating a Web site. In order to fully automate a Web site, data about the target site must be obtained using function 231. For example, HTML data structure must be obtained for each site. The data paths and processes used to access services from a site must be mapped. It may also be desired to record other data during a monitoring period before any automated routines are written for providing proxy access to a site.

When enough data is obtained about a site by virtue of monitoring and statistics gathering function 231, the target site is assigned to developer 210 for production and future maintenance. In one embodiment of the present invention a developer may specialize in a certain type of sites. For example, one developer may be assigned to all sports-related sites. Another developer may be assigned to all news-related sites. Yet another developer may be assigned to all finance-related sites. In this way developers may specialize in developing and maintaining the kind of routines that work well with specific types of sites.

Software 205, in a preferred embodiment, utilizes special software modules (not shown) for obtaining specific types of data from a web site. Some of this data is, of course, required before routines may be written by developers to automate a site. Other types of data must be obtained through persistent site monitoring in order to inform developers when certain activity or status changes occur at a site wherein such changes may affect the functionality of automated access to the site. Because there are many categories of data that may be obtained from any single Web site, specialized reporting modules are used by software 205 for accessing and reporting specific types of data. Although such modules are not specifically illustrated in this embodiment, one with skill in the art will recognize the logical use and implementation of such modules from further description provided below.

A job order/status reporting module is provided within software 205 and adapted to generate a continually or frequently updated production report on the process of automating a particular web site. Such a report may be obtained through production database 200. In this way site developers, managers, and other individuals concerned with the process may view current status related to the production of sites-in-progress.

A compatibility assessment module is provided within software 205 and adapted to assess various technologies used in a web site and generate reports suggesting compatible technologies that may be used in providing successful automation to a site. For example, if a Web service uses Surround video technology and a selection technique for viewing and selecting items available for purchase, then an automated routine for accessing the service must incorporate an interface that understands that process. A compatibility assessment routine is completed, in a preferred embodiment, before any automated routines are written for a particular web site.

A content specification module is provided within software 205 and adapted to generate a report specifying the content available from a particular web site. This data would also be obtained before any automated routines are written for accessing services from the site. In one aspect, a determination of negative content made available for a site may cause such a site to be rejected for production and de-selected for automation.

Developer 210, through communication with software 205, may access all of the relevant data required to begin developing automated routines for accessing the site and performing services offered through the site. This is illustrated by a bi-directional communication arrow labeled communication illustrated between developer 210 software 205. In one embodiment, developer 210 may simply access an assignment sheet to view newly assigned job orders, and then access the relevant data about the sites from a connected data repository (DR 203 FIG. 9). In another embodiment, notifications may be sent to developer 210 when the sites are assigned and data is available to begin production.

Once developer 210 creates automated routines that will ultimately be used to access and perform services through a site on behalf of users, it is desired that the routines may be tested for functionality before actually being implemented as a functional and automated template that will be used by a navigation system at the site (debug). If automated routines were allowed to stand before being tested, they may fail in the field causing inconveniences for both the navigation system and for end-users. Therefore, a performance test module is provided within software 205 and adapted to emulate or model the software processes required for successful interaction with a site. A test module is created for and is specific to a particular site. Developer 210 may execute automated routines on the test module to see if they will succeed or fail. A test module may include a reporting feature for generating a failure report, which lists the point and cause of failure of an executed routine. Testing routines before actual implementation greatly increases the efficiency of a proxy navigation system as a whole.

After a site is successfully automated and ready for implementation, a link to the newly offered site is sent to portal server 219 as illustrated by a directional arrow emanating from software 205 to portal server 219 and labeled link to site added. A newly offered site may be presented in a list of sites made available through portal server 219 to portal-service subscribers (portal subscriber 217).

Continued monitoring of an added web site is performed by software 205 after a site is automated and made available to portal subscribers. In a preferred embodiment, specialized modules are used in this phase of monitoring as well. For example, a statistics module is provided within software 205 and adapted to obtain statistics related to ongoing instances of accessing the site on behalf of portal subscribers. Such statistics may include but are not limited to site performance statistics, instances of site access per given time period, percentage of services requested from the site, statistics related to continued popularity of the site, and so on.

A site history module is provided within software 205 and adapted to compile a history report related to content updates, address changes, added technologies, and other changes made to a particular site, some of which may directly affect success or failure and accessing the site and performing services at the site. It is intended, of course, that any immediate changes to a Web site are reported back to a developers charged with maintaining the site for automated access. However, compiling a history may also aid a developer in predicting when a site change may occur.

An error history module is provided within software 205 and adapted to compile an error history report detailing successes and failures of automated routines, which are logged in ongoing fashion as a site is routinely accessed and manipulated for services. Such a report can be studied by a developer to determine best ways for streamlining automated routines, and perhaps fine-tuning them for more efficient execution.

A bug reporting module is provided within software 205 and adapted to compile a list of open bugs still affecting a site. This report may be included in production database 200 so that production status may be obtained concerning the process of fixing or working around existing bugs in a particular web site. In this way, a third party may observe the progress of fine-tuning and maintaining automation of a web site after a site is added. If a particular web site is currently not fully automated because of bugs, which have occurred since automation, a developer charged to the site may be notified as a matter of priority, to escalate work on the effected site.

An error dump module is provided within software 205 and adapted to compile a detailed error report listing all of the errors have occurred with a particular site including all of the parameters connected to such errors. This report logs the type of error, the point of error, the cause of the error, and the system result of the error. Any personal information connected to the error such as user ID, credit card information, Social Security information, or any other personal information is automatically discarded before the error is entered into a dump file. In this way, errors may be researched in detail without releasing or compromising any user information.

In one embodiment of the present invention specialized modules as described above may in some instances be distributed within servers 228, 229, and 230 as self-contained modules adapted to report information back to software instance 205. In other embodiments, the specialized modules described above may be executed from within server 201 of FIG. 9. There are many possibilities. Breaking software 205 down into a plurality of specialized modules allows for independent and succinct reports and activity logs which are dedicated to revealing specific conditions and states related to tracked websites.

It will be apparent to one with skill in the art that the method and apparatus of the present invention provides an automated way to obtain virtually any type of information from a web site or hosting server. Furthermore, dividing the functionality of software 205 into a plurality of dedicated modules allows data to be quickly organized into usable format for access by developers. The method and apparatus of the present invention greatly enhances the production of web site developers in that they are not required to physically obtain the information through traditional methods. Moreover, efficiency in creating compatible routines for enabling automated access and site manipulation is greatly enhanced by providing developers with a wealth of information that is immediately accessible.

The inventor intends that the architecture, as well as the general process illustrated herein represent exemplary embodiments for practicing the present invention. There are many other embodiments wherein the method and apparatus of present invention may be practiced. The method and apparatus of the present invention may be practiced via private individuals on the Internet, businesses operating on a WAN connected to the Internet, businesses operating via private WAN, and so on. There are many customizable situations.

Website Change Detection

In one aspect of the present invention, an alternative method and apparatus is provided for the purpose of detecting changes or updates to websites and affecting efficient and timely repairs to the instruction templates, which are used for proxy navigation to and interaction with the sites.

Figure 11:
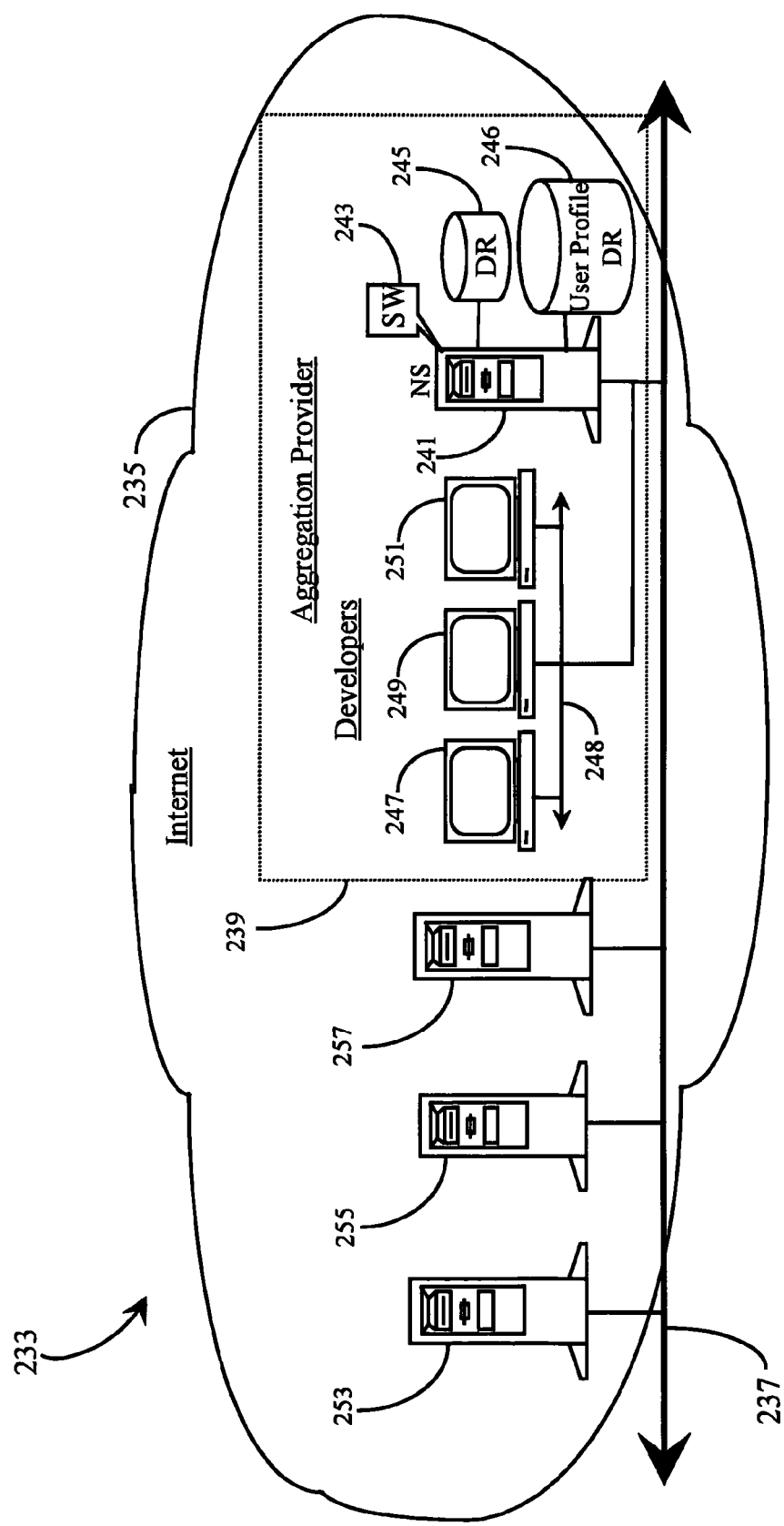
FIG. 11 is an overview of a network architecture wherein website change detection is practiced according to an embodiment of the present invention.

FIG. 11 is an overview of a network architecture 233 wherein website change detection is practiced according to an embodiment of the present invention. Network architecture 233 comprises a data-packet-network 235, an aggregation service provider 239, and a plurality of Web servers 253, 255, and 257.

Data-packet-network 235 is, in this example, the Internet network. The inventor chooses the Internet as a preferred example in this specification because of it's high public-access characteristic. The present invention may also be practiced on a corporate or private wide-area-network (WAN), a corporate or private local-area-network (LAN), an Intranet, or any combination of the above as long as Internet transaction and communication protocols are supported and observed.

An Internet backbone 237 is illustrated as passing through Internet cloud 235 and represents all of the lines, equipment, and connection points to make up the Internet network as a whole. Therefore, there is no geographic limitation to practice of the present invention. In this example, Internet backbone 237 provides logical network connection to servers 253-257 and to network equipment residing within aggregation provider 239.

Aggregation provider 239 is analogous to portal domain 199 of FIG. 9 above. Provider 239 is a data aggregation and summary service provider capable of obtaining aggregating and summarizing data on behalf of users requiring no direct user interaction.

Web servers 253-257 represent Internet servers hosted by various companies making information and services available to users through the Internet network (235). Servers 253-257 are adapted to serve electronic information pages, commonly referred to as Web pages in the art, to requesting users. Such electronic information pages are typically hyper-text-markup-language (HTML) interactive interfaces, however such interfaces are not limited to HTML as there are other known Internet-capable languages used for constructing Web pages.

Provided within aggregation provider 239 (dotted rectangle) are three Web developers illustrated herein as computer icons 247, and 249, and 251. The use of computer icons in this representation symbolizes standard workstations used by developers of software applications utilized by provider 239. Developers represent human resources manning computers 247-251. In this example, computer stations 247-251 are interconnected by virtue of a LAN network 248. There may be many more computer stations that are illustrated in this example without departing from the spirit and scope of the present invention. The bi-directional arrows illustrated on LAN 248 illustrate LAN connectivity to still more computers can possibly other types of equipment.

Computer stations 247, 249, and 251 are adapted by virtue of software (not shown) to enable developers to create and repair functional software scripts or templates used by provider 239 for enabling proxy navigation to and interaction with electronic information pages stored in servers 253, 255, and 257. It may be assumed in this example than one developer, sometimes referred to as a knowledge worker, is stationed at each computer 247, 249, and 251. The responsibility of the described developers is to ensure that proxy navigation sequences conducted on behalf of users run smoothly and successfully with little or no error occurrences.

A navigation server (NS) 241 is illustrated within the domain of provider 239 and adapted as a proxy navigation and interaction system capable of spawning personalized instances of a navigator for performing duties on behalf of a requesting user. Each instance of navigator performs according to an executable, machine-readable template. Each template defines and directs the ordered navigation and interaction task. An actual parent instance of navigation software and spawned navigator instances are not detailed in this example but may be assumed to be present and operative.

A data repository 246 is illustrated within the domain of provider 239 and is connected to navigation server 241 by a high-speed data link. Repository 246 is mostly dedicated to storing user profile data along with instruction templates used for proxy navigation and interaction with websites. A data repository 245 is also illustrated within the domain of provider 239, and is also connected to navigation server 241 by a high-speed data link. Repository 245 is adapted to store records of website changes wherein the changes may require existing navigation templates to be updated in order to provide successful and non-interrupted navigation and interaction for users patronizing the service. In this example data repositories 245 and 246 are external repositories. However, they may also be internal data repositories. Repository 246 is illustrated as directly connected to navigation server 241, however in actual practice repository 246 is connected to a main portal server (user interface), which is not shown in this example. Repository 246 may be accessible through a main portal server and through navigation server 241.

A software application (SW) 243 is provided and adapted to reside within navigation server 241. Software application 243 is adapted to provide a unique monitoring and flagging service that uses navigation routines (templates) to sample electronic information pages in order to determine if any changes have occurred which may interrupt normal proxy navigation routines. Navigation server 241, in addition to running actual requested routines, also periodically executes sample routines created solely for the purpose of detecting any changes in site architecture. Sample routines, also termed scripts by the inventor, are created by software developers manning computer stations 247-251.

Software 243 is integrated with navigation software such that any actual or sample navigation scripts flag the first encountered error in the navigation routine that results in a failure to successfully complete the routine. Error scripts are deposited into data repository 245 in the form of error files (file dump). Error files are accessed by developers 247-251 as they occur in data repository 245. Error files contain site identification and failed scripts with a flag identifying the first encountered error or change detected by the script. Using this information, developers manning stations 247-251 physically navigate to the target websites using their own navigation systems (browser applications). Once the target sites are accessed, developers may obtain the source information of the sites including any structural changes that may need to be implemented in repairing navigation scripts.

It is noted herein that navigation scripts are, in preferred embodiments, executable instructions created with Java-based applications or other object-oriented tools. A navigation script includes all of the required instruction for navigating to sites and all of the required instruction for navigating through the sites. It is also noted herein, that a through-site portion or site logic portion of a navigation script may contain more than one identifiable interaction task. Therefore, site-logic blocks, which are modular parts of whole navigation orders contain all of the possible interaction instructions available at the associated site. In a given navigation order, the associated site-logic blocks are activated to enable only the specified interactions described in the request portion of the order specified by the requesting user.

The modular concept used in constructing navigation orders enables site-logic portions as well as login portions and other functional portions of the order to be interchanged in an efficient manner. For example, if a navigation order enables navigation to and auto-login with a particular website, the same order may be used for all individuals. Only the auto-login block of the order, which is different for each individual, would need to be interchanged. The inventor provides through software 243 that existing navigation orders may have obsolete site-logic blocks replaced with updated site-logic blocks in an automated fashion. More about this capability is described below.

In practice of the present invention, it is desired that actual orders are frequently updated with any required changes before an opportunity exists for navigation failure due to improper logic. Therefore, developers manning stations 247-251 create dummy navigation scripts, which are dispatched to all known websites by virtue of navigation server 241. Such dummy scripts are sent on a periodic basis in order to quickly discover when a website has been updated structurally. If a dummy script is successful in navigating through the site using all of the interaction options known to be available at the site, then it is assumed that the site has not been structurally changed. However, when a dummy script fails at some point during navigation through the site, the script, the site identification, and a flag denoting the point of failure are sent as an error file to data repository 245.

Web developers manning stations 247-251 routinely and periodically access data repository 245 in order to pull error files indicating changed sites. Using their own Web browsers, developers manning stations 247-251 physically navigate to all suspected sites, which in this example are served by Web servers 253-257. Once a suspected site has been successfully accessed by a Web developer, the source information and structure of the site is accessed and incorporated for progress of affecting repair to the dummy template, which originally failed at some point while navigating through the site.

A new site-logic block is created to replace a now defunct site-logic block resulting in a template that now successfully navigates through the site. All existing navigation orders employing the same defunct site-logic block are automatically updated in all of the databases wherein they may occur. In this way, existing navigation orders are automatically updated in the most efficient manner.

In addition to creating and dispatching dummy navigation scripts, existing scripts operating on behalf of users are also dumped into data repository 245 if a navigation or interaction failure occurs. In this case, all personal data to a user such as credit card numbers, user names, passwords, and the like are deleted or masked or security reasons. It is a goal of the present invention to avoid failure of an actual operating script by diligently dispatching dummy scripts periodically in order to catch changes before they affect actual client data orders.

Figure 12:
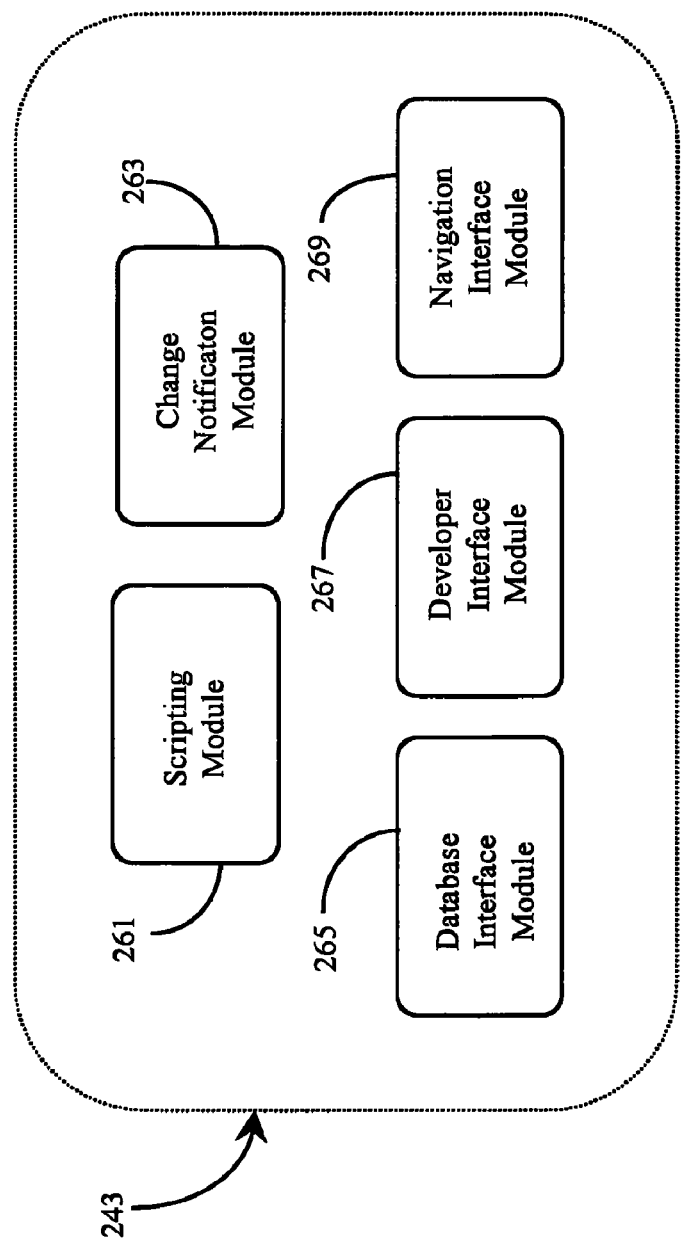
FIG. 12 is a block diagram illustrating various functional modules that are part of change detection software according to an embodiment of the present invention.

FIG. 12 is a block diagram illustrating various functional modules that are part of change detection software 243 of FIG. 11 according to an embodiment of the present invention. Software 243 as described above, is provided to enable creation of dummy navigation scripts that may be used for test navigation to and interaction with known websites. Software 243 contains various functional modules for purposes of enabling various functions.

A scripting module 261 is provided within software 243 and adapted to allow dummy templates to be created and modified. Module 261 functions as a developer tool capable of building, inserting, deleting, and otherwise modifying parameters associated with a navigation order. It is important to note herein, that in a case of dummy scripting, known actual user passwords, user names, or other user information of the personal nature to a client is not required. The service provider may maintain it's own separate accounts with all of the websites that may be subject to testing. In the undesirable event that an actual navigation order performing on behalf of a user encounters failure during performance, all personalized information contained in the order that may be personal to the requesting user is deleted or masked before an error file containing the order is created.

The change notification module 263 is provided within software 243 and adapted to enable a flag to be set at the first point-of-failure. For example, if a navigation and interaction sequence is successful up until a certain table or another interactive feature of the target site must be accessed, and it proceeds to fail because the table or other interactive feature is missing, then a flag would be set at that particular point in the sequence. Because a navigation sequence comprises actions perform in a serial fashion, only a first failure-point wherein further navigation and/or interaction may not proceed is flagged. A developer then would subsequently access the site and obtain the source information from the point-of-failure on.

A database interface module 265 is provided within software 243 and adapted to enable developer and system interfacing with data repositories 245 and 246 of FIG. 11. Such interface capability includes entering error files into a file dump and propagating repaired instruction modules to existing templates contained in repository 246 or in other repositories. Module 265 also enables Web developers to access data repositories 245 and 246 of FIG. 11. A developer interface module 267 is provided within software 243 and adapted to function as a direct communication interface to Web developers operating on a network. In one embodiment, interface module 267 works in conjunction with scripting module 261 allowing a developer to interface with software 243 and create and repair scripts at the same time. In another embodiment, scripts are updated off-line without using module 243. In this case, scripting module 261 would be provided in another location such as on one of workstations 247-251 of FIG. 11.

A navigation interface module 269 is provided within software 243 and adapted to integrate to proxy navigation software for periodic execution of the dummy navigation scripts described above. In one embodiment of the present invention, an additional proxy navigation system is provided and dedicated for executing test scripts created by the Web developers of FIG. 11. In this way, execution of actual client orders is not in any way delayed by insertion of test runs into the system.

The execution of dummy or test scripts occurs periodically at a frequency, which is preferably greater than the frequency of client navigation to websites using the same scripts. In some cases, websites will be so popular that checking them with a greater frequency than actual client usage will be difficult if not impossible. In these cases, dummy scripts are routines may be executed at certain times when client usage is at its lowest point.

It will be apparent to one with skill in the art that there may be more functional modules provided within software 243 than are illustrated in this example without departing from the spirit and scope of the present invention. For example, an alert module may be provided and adapted to tag all existing navigation routines immediately upon discovering through a test run that a website has been changed to an extent where the existing routines would fail. Such an alert would automatically delay any subsequent execution of tagged routines until the appropriate logic blocks of those routines are replaced with updated blocks. In this way, appropriate notification can be sent to users requesting on-demand services. Such a notification may simply inform a user that results of his request may be delayed by an estimated time period not to exceed one or two hours (window of repair time). If a time parameter is applied at the instant of a flag-set indicating discovery of a website change, then a user may be quoted an estimated time for successful application of a request. Most change orders are successfully completed by Web developers within a two hour time window.

Figure 13:
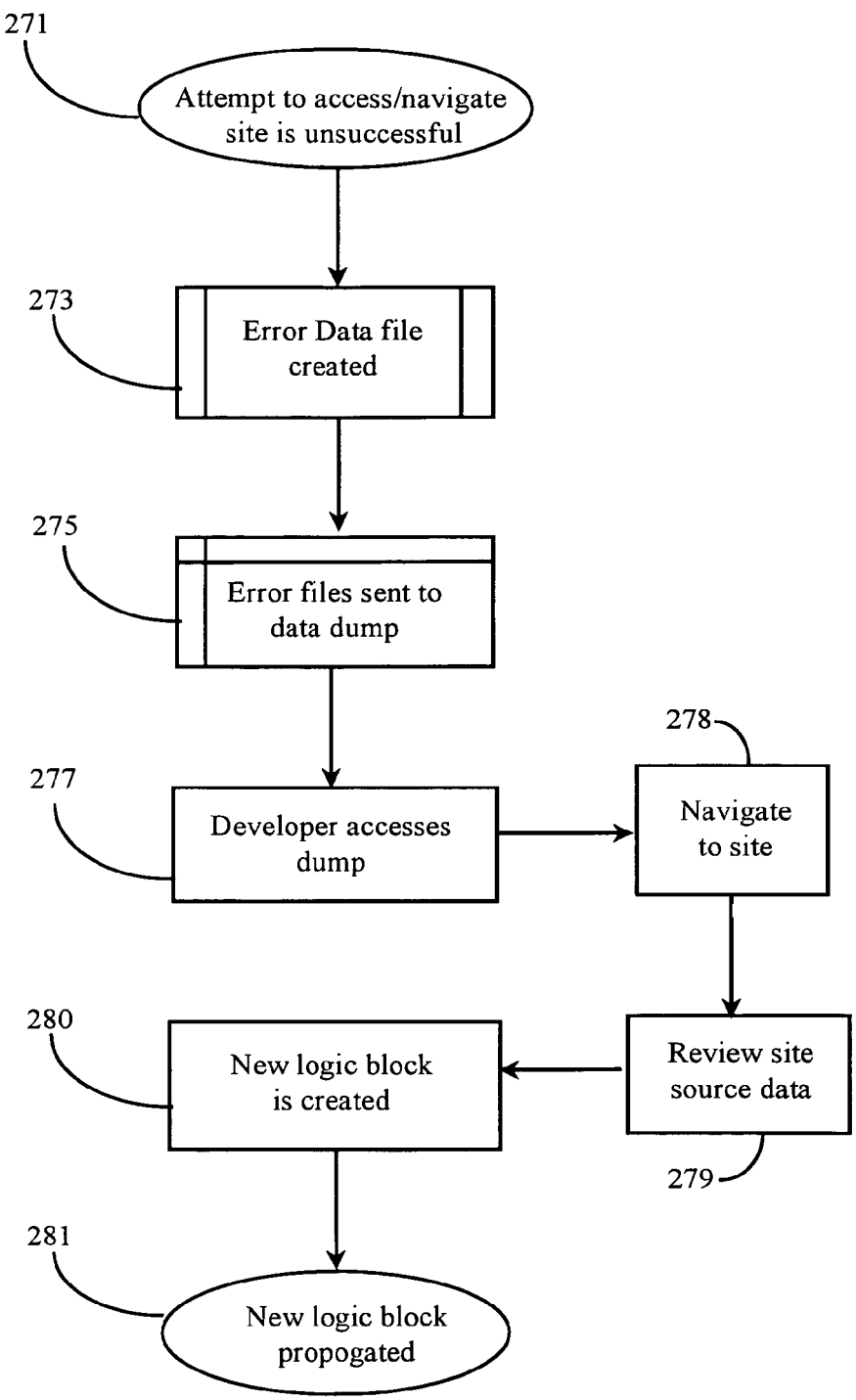
FIG. 13 is a process flow diagram illustrating steps wherein website change detection and reporting is practiced, according to an embodiment of the present invention.

FIG. 13 is a process flow diagram illustrating steps for practicing website change detection according to an embodiment of the present invention. At step 271, an attempt to access and navigate through a site is unsuccessful due to a change in website architecture rendering one or more interactive options available at the site unavailable to current site logic routines developed for the site. In preferred embodiments, this is discovered through executing dummy navigation scripts wherein no client is involved. In some cases however, an actual client order may fail at some point of navigation indicating a website change. In either case, a flag is set at a first point in the routine that was unsuccessful and an error file is created at step 273. The error file contains the navigation order flagged at a point in the routine where the failure occurred, identification of the associated site, and a brief description of the error if available.

At step 275, error files are entered into a file dump in a data repository where they may be later accessed for review. Steps 271, 273, and 275 occur on an ongoing basis. Error files are continually being entered into a data repository as they are created. At step 277, a Web developer charged with incorporating changes into existing navigation routines accesses the data dump of step 275 and obtains the error file containing the logged failure, which occurred at step 271.

Using the information contained in the file, the Web developer navigates to the suspect website using his or her personal navigator at step 278. Once the suspect website has been accessed by the Web developer, the source information for the site is accessed by the Web developer. The source information contains all of the sites data structure including structural updates or changes that have been applied at the site since the last successful interaction with the site.

At step 280, a new logic-block (script) is created by the Web developer incorporating the new source information accessed from the site. It is important to note herein that there may be only one, or more than one change that has to be incorporated into a new logic block. Likewise, there are wide variety of changes that might be present. For example, a structure change within a website may include rearrangement of tables, hyperlinks, and so on. There may be additional hyperlinks added, existing hyperlinks removed, as well as address changes and other structural alterations. All of the structural updates are accessible from the source information of a website. The new correct information is used in the construction of a new logic block.

At step 281, the new logic block created in step 280 is mirrored to all of the existing navigation orders containing now-defunct logic blocks. The new logic block installs itself in place of the defunct blocks in all existing navigation orders warehoused for clients. Navigation orders utilizing variable functions of logic blocks containing more than one interactive function must be reviewed to determine if the correct one or number of available functions within the new logic block is still properly identified for execution according to order. For example, a site-logic block may contain four optional functions of which only one of the functions is identified for execution by particular navigation order.

If a function available at a website as originally identified in a navigation order has been eliminated, replaced, or altered in a new logic block such that it is not, the portion of the navigation order identifying the function must be modified to suit. This may be accomplished in an automated fashion by adding a parsing and scripting function to server software responsible for management of the individual navigation orders. For example, upon instance of a new logic block installation into a navigation order, the parsing function parses the new function identifier. The scripting function than replaces the old function identifier with the new function identifier. In this way, the original navigation order may utilize the correct action specified within the new logic block. If a new logic block no longer contains the function option identified for execution in a particular navigation order, then that navigation order is no longer valid for performing the intended user request. In such a case, notification would be sent to the requesting user.

It will be apparent to one with skill in the art, that the method and apparatus of the present invention enables automated website change detection without burdening hosts of such sites with requirements for embedding data-reporting modules or the like. Furthermore, the modular and executable nature of site-navigation and logic blocks promotes automated installation of updated versions into proxy-navigation orders.

The present invention as taught herein and above should be afforded the broadest of scope. The spirit and scope of the present invention is limited only by the claims that follow.

What is claimed is:

1. A method for receiving notification of structural changes applied to electronic information pages accessed by a proxy network navigation and interaction system and effecting updates to navigation templates based on the change information, comprising steps of:
   (a) establishing notification of failed execution of one of the navigation templates interacting with electronic information pages on a data-packet-network, the navigation templates assembled from a plurality of functional logic blocks;
   (b) recording only parameters of the navigation template associated with the cause of failure during live execution at the electronic information pages by the proxy, including identification of at least one modular logic block involved at the point of failure;
   (c) accessing the recorded instance of the failed navigation template for review purposes;
   (d) navigating to the electronic information page identified in the recorded instance;
   (e) determining information necessary to repair the logic block involved at the point of failure;
   (f) creating a new modular logic block according to the information; and
   (g) automatically installing the newly created modular logic block into the navigation template that failed, and automatically identifying the defunct site logic block in all existing stored navigation templates that depend on the failed logic block and replacing it with the newly created modular logic block.

2. The method of claim 1, wherein the data-packet-network is an Internet network and electronic information page is a web page hosted on the network.

3. The method of claim 2, wherein the navigation template is a test navigation template created for testing the web pages on the Internet.

4. The method of claim 2, wherein the navigation template is stored as a client navigation template executed to perform services for the client.

5. The method of claim 2 wherein in step (b), the recorded instance of a failed routine is created in the form of a data file and stored in a data repository accessible through the network.

6. The method of claim 5 wherein in step (c), the recorded instance of the failed navigation routine is accessed by a human software developer.

7. The method of claim 6 wherein in step (d), navigation is performed by the developer utilizing an instance of browser software installed on a computerized workstation.

8. The method of claim 7 wherein in step (g), the modular logic block self-installs to a depended navigation template.

9. The method of claim 1 wherein a step is added between steps (f) and (g) for testing the modular logic block before implementation.

10. The method of claim 8 wherein in steps (b) and (g) more than one modular logic block is identified as defunct and replaced in navigation templates.

* * * * *